(12) United States Patent
Nakatani

(10) Patent No.: US 8,213,280 B2
(45) Date of Patent: Jul. 3, 2012

(54) DISC DEVICE

(75) Inventor: Morio Nakatani, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 108 days.

(21) Appl. No.: 12/644,910

(22) Filed: Dec. 22, 2009

(65) Prior Publication Data

US 2010/0165803 A1 Jul. 1, 2010

(30) Foreign Application Priority Data

Dec. 26, 2008 (JP) ................................ 2008-333996

(51) Int. Cl.
*G11B 5/09* (2006.01)

(52) U.S. Cl. ................ 369/47.42; 369/47.44; 369/47.5; 369/44.14; 360/75; 360/250

(58) Field of Classification Search ........................ None
See application file for complete search history.

(56) References Cited

U.S. PATENT DOCUMENTS 5,587,973 A * 12/1996 Kanazawa et al. ......... 369/13.21
6,765,746 B2 * 7/2004 Kusumoto ..................... 360/75

FOREIGN PATENT DOCUMENTS

JP 2004-139654 A 5/2004

* cited by examiner

*Primary Examiner* — Muhammad N Edun
(74) *Attorney, Agent, or Firm* — Ditthavong Mori & Steiner, P.C.

(57) ABSTRACT

A disc device for recording and/or reproducing information with respect to a disc having flexibility includes a head for writing and/or reading, the head being disposed below the disc; a disc rotating section which rotates the disc; and a head retracting section which retracts the head to a retracted position where contact with the disc is avoidable, based on a judgment that power supply to the disc device is cut off.

7 Claims, 15 Drawing Sheets

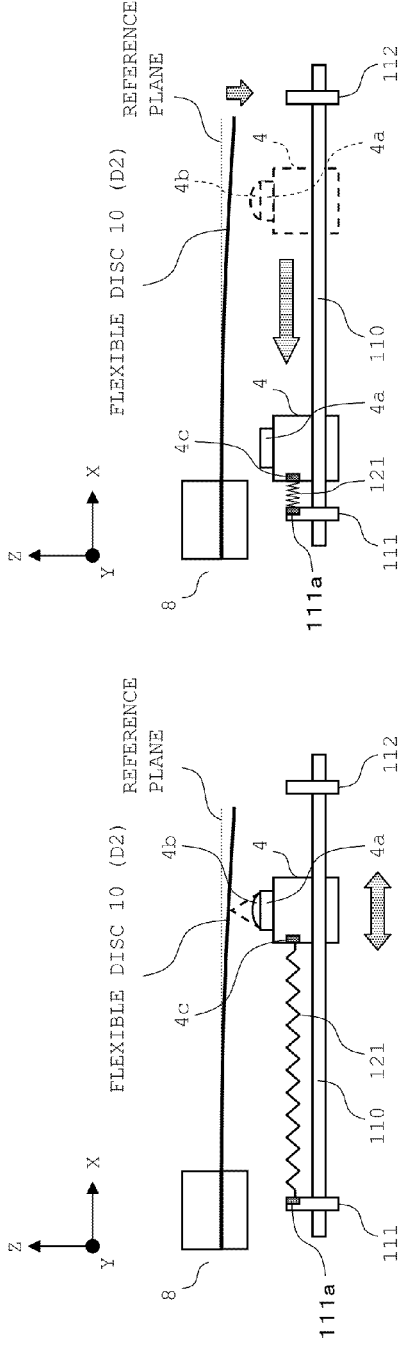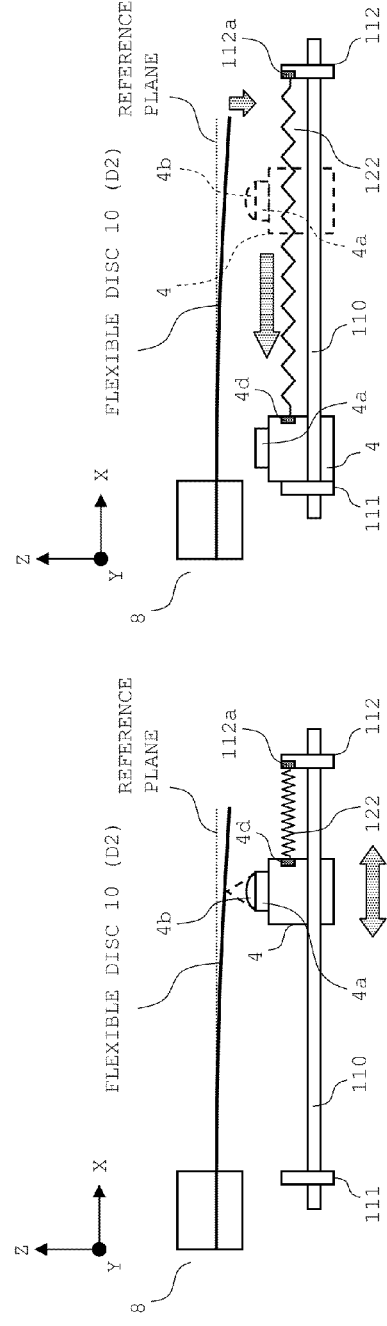

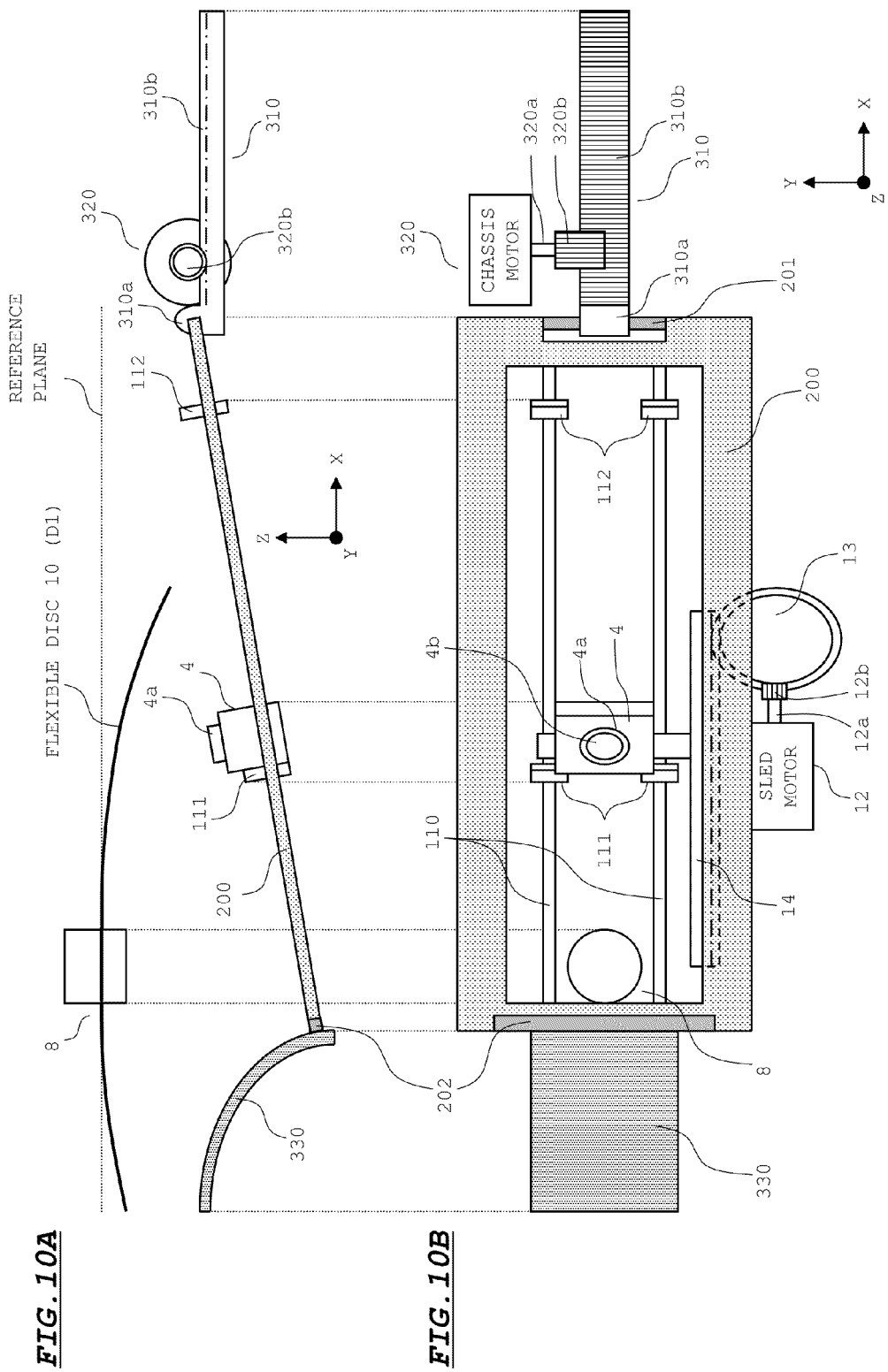

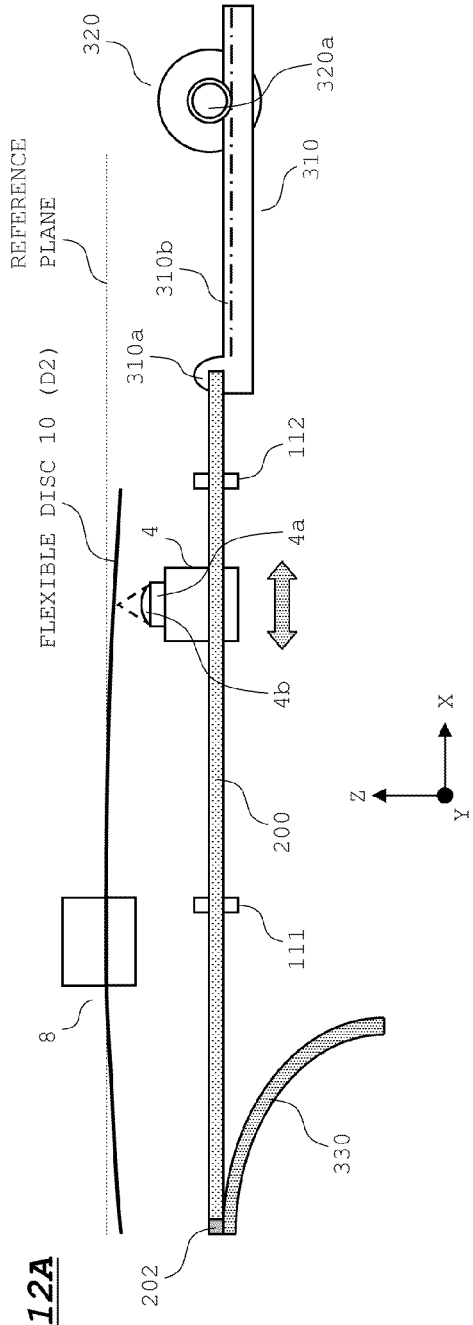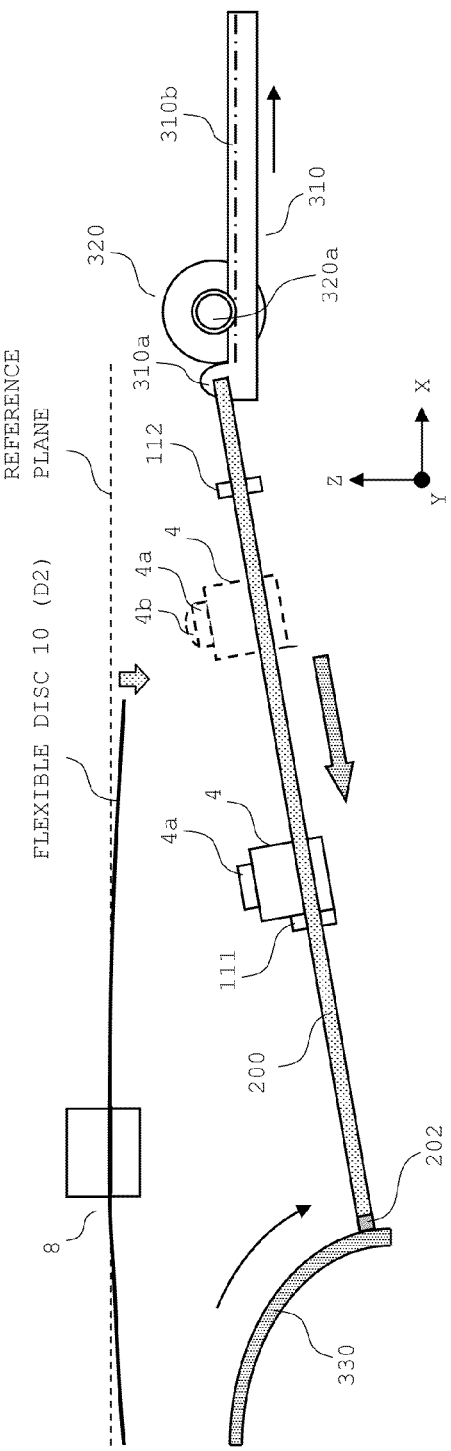
FIG.12A
FIG.12B

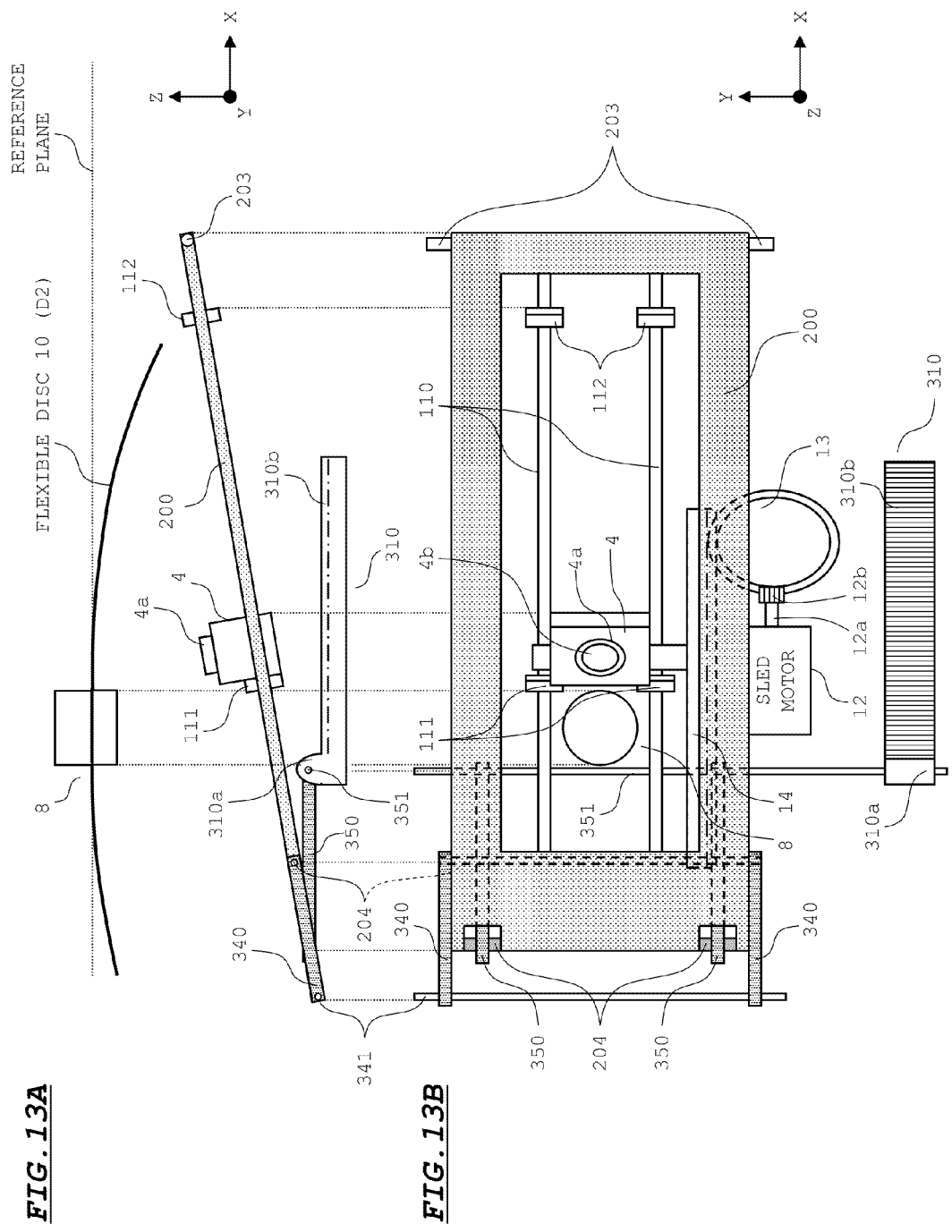

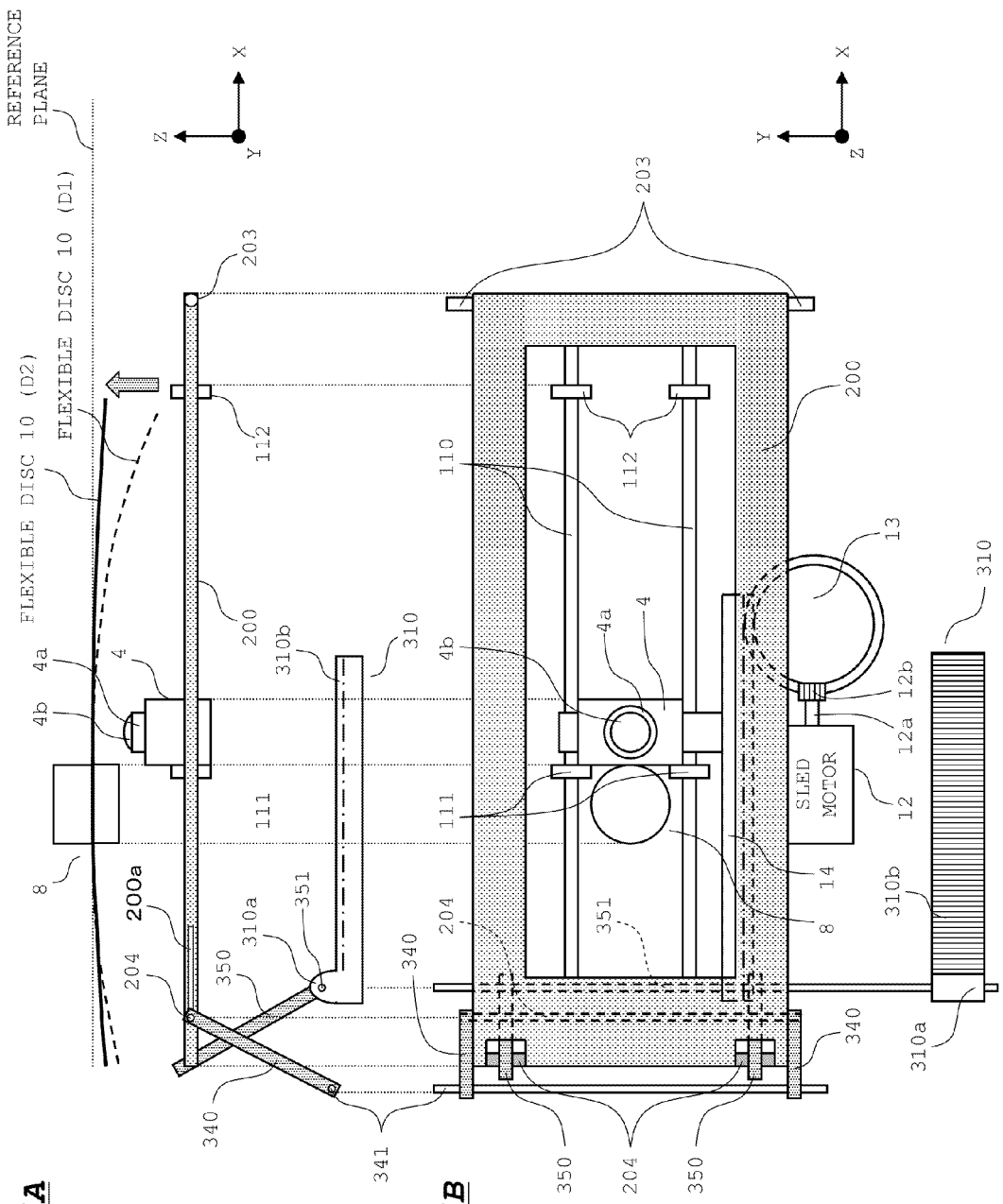

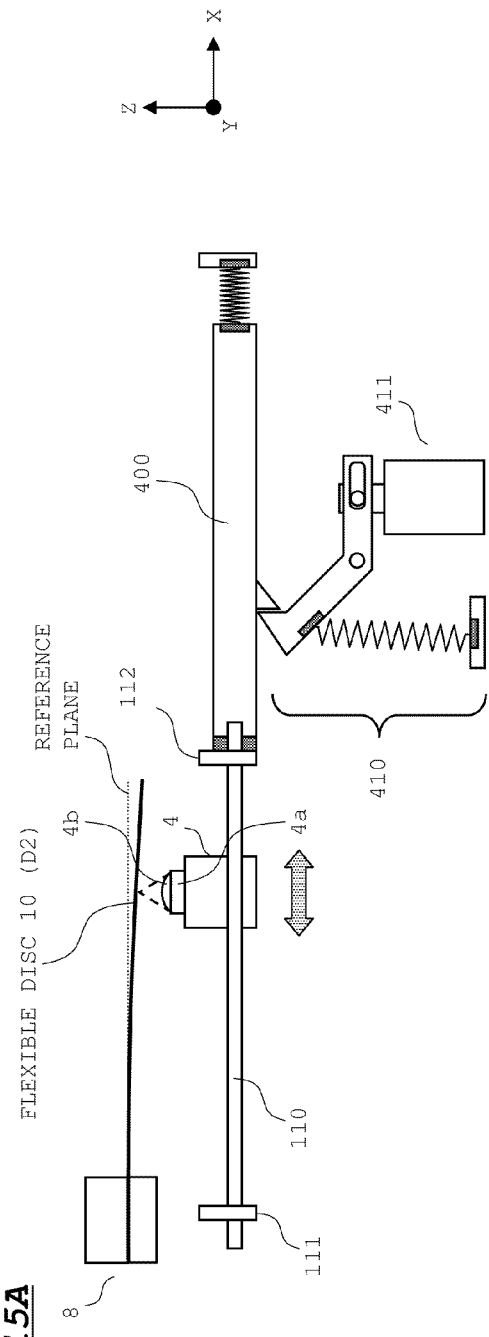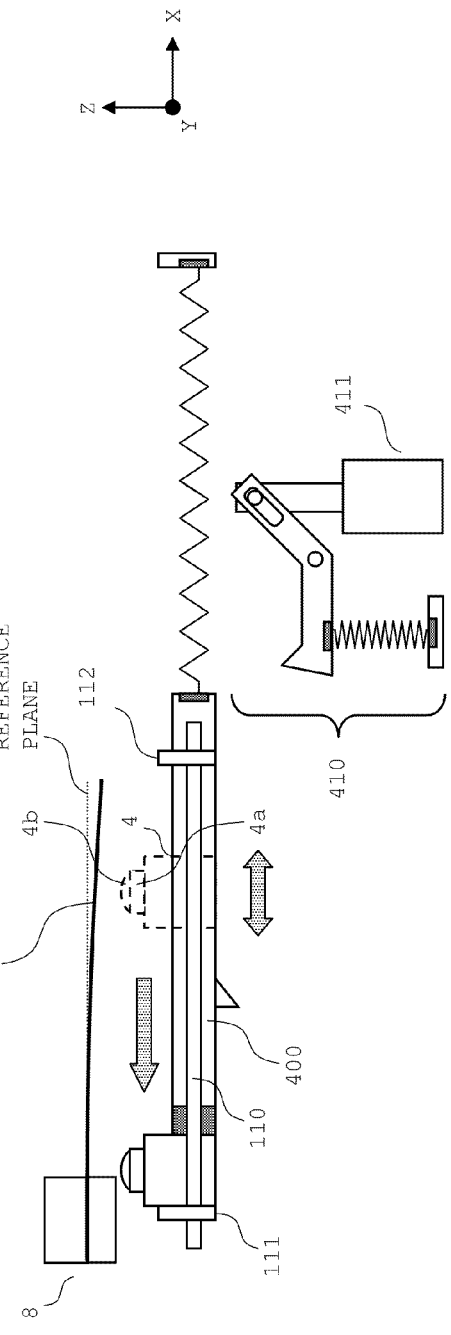

DISC DEVICE

This application claims priority under 35 U.S.C. Section 119 of Japanese Patent Application No. 2008-333996 filed Dec. 26, 2008, entitled "DISC DEVICE". The disclosure of the above application is incorporated herein by reference.

BACKGROUND OF THE INVENTION

1. Field of the Invention

The present invention relates to a disc device for recording and/or reproducing information with respect to a disc having flexibility.

2. Disclosure of Related Art

In recent years, as digital technology has been developed, increasing the capacity of an optical disc has been demanded. An example of a method for increasing the capacity of an optical disc is minimizing the spot diameter of laser light. The spot diameter minimization is realized by increasing the numerical aperture (NA) of an objective lens, in addition to reducing the wavelength of laser light. As the spot diameter is minimized, it is necessary to reduce the distance between an objective lens and a recording surface of an optical disc.

In the conventional optical disc system, however, if the distance between an objective lens and a recording surface of an optical disc is reduced, the objective lens may be contacted with a surface of the optical disc, resulting from rotational displacement at the time of rotating the optical disc at a high speed, and/or an optical pickup or the optical disc may be damaged. Further, in the case where rotational displacement of an optical disc is large, or in the case where an optical disc is rotated at such a high speed as 10,000 times or more per minute to realize a high transfer rate, the optical disc itself may be damaged.

In view of the above, there has been developed an optical disc (hereinafter, called as a "flexible disc"), wherein a recording surface is formed on a thin film having flexibility. Recording and/or reproducing information with respect to a flexible disc is performed by an optical pickup device, after plane displacement of the flexible disc is eliminated. The flexible disc has a feature that the disc can be rotated at a higher speed because the disc weight is reduced by reducing the thickness of a disc substrate, and as a result, an influence by centrifugal force is suppressed.

However, if power supply to the optical disc device is abruptly cut off due to a power outage, a flexible disc which has been kept in a proper state by rotation may be bent toward the optical pickup device, as the rotational speed (the rotation number per unit time, hereinafter simply called as "the rotation number") is reduced. In this case, the flexible disc and/or the optical pickup device may be damaged by contact. The drawback may also occur in a case that the rotation number of the flexible disc is reduced due to some reason, other than the case where power supply is cut off.

SUMMARY OF THE INVENTION

A first aspect of the invention is directed to an disc device for recording and/or reproducing information with respect to a disc having flexibility. The disc device according to the first aspect includes a head for writing and/or reading, the head being disposed below the disc; a disc rotating section which rotates the disc; and a head retracting section which retracts the head to a retracted position where contact with the disc is avoidable, based on a judgment that power supply to the disc device is cut off.

A second aspect of the invention is directed to a disc device for recording and/or reproducing information with respect to a disc having flexibility. The disc device according to the second aspect includes a head for writing and/or reading, the head being disposed below the disc; a disc rotating section which rotates the disc; and a head retracting section which retracts the head to a retracted position where contact with the disc is avoidable, based on a judgment that a rotational speed of the disc falls below a predetermined threshold value.

A third aspect of the invention is directed to a disc device for recording and/or reproducing information with respect to a disc having flexibility. The disc device according to the third aspect includes a head for writing and/or reading, the head being disposed below the disc; a disc rotating section which rotates the disc; and a head retracting section which retracts the head to a retracted position where contact with the disc is avoidable in a condition that the disc is likely to be contacted with the head resulting from lowering of a rotational speed of the disc.

BRIEF DESCRIPTION OF THE DRAWINGS

These and other objects, and novel features of the present invention will become more apparent upon reading the following detailed description of the embodiment along with the accompanying drawings.

FIGS. 9A through 9D are diagrams showing arrangements and operations of modification examples 1 and 2.

FIGS. 10A and 10B are diagrams showing an arrangement and an operation of the modification example 3.

FIGS. 12A and 12B are diagrams showing an operation of the modification example 3.

FIGS. 13A and 13B are diagrams showing an arrangement and an operation of the modification example 4.

FIGS. 14A and 14B are diagrams showing an arrangement and an operation of the modification example 4.

FIGS. 15A and 15B are diagrams showing an arrangement and an operation of another modification example, wherein the optical pickup device is biased to a retracted position.

Figure 1:
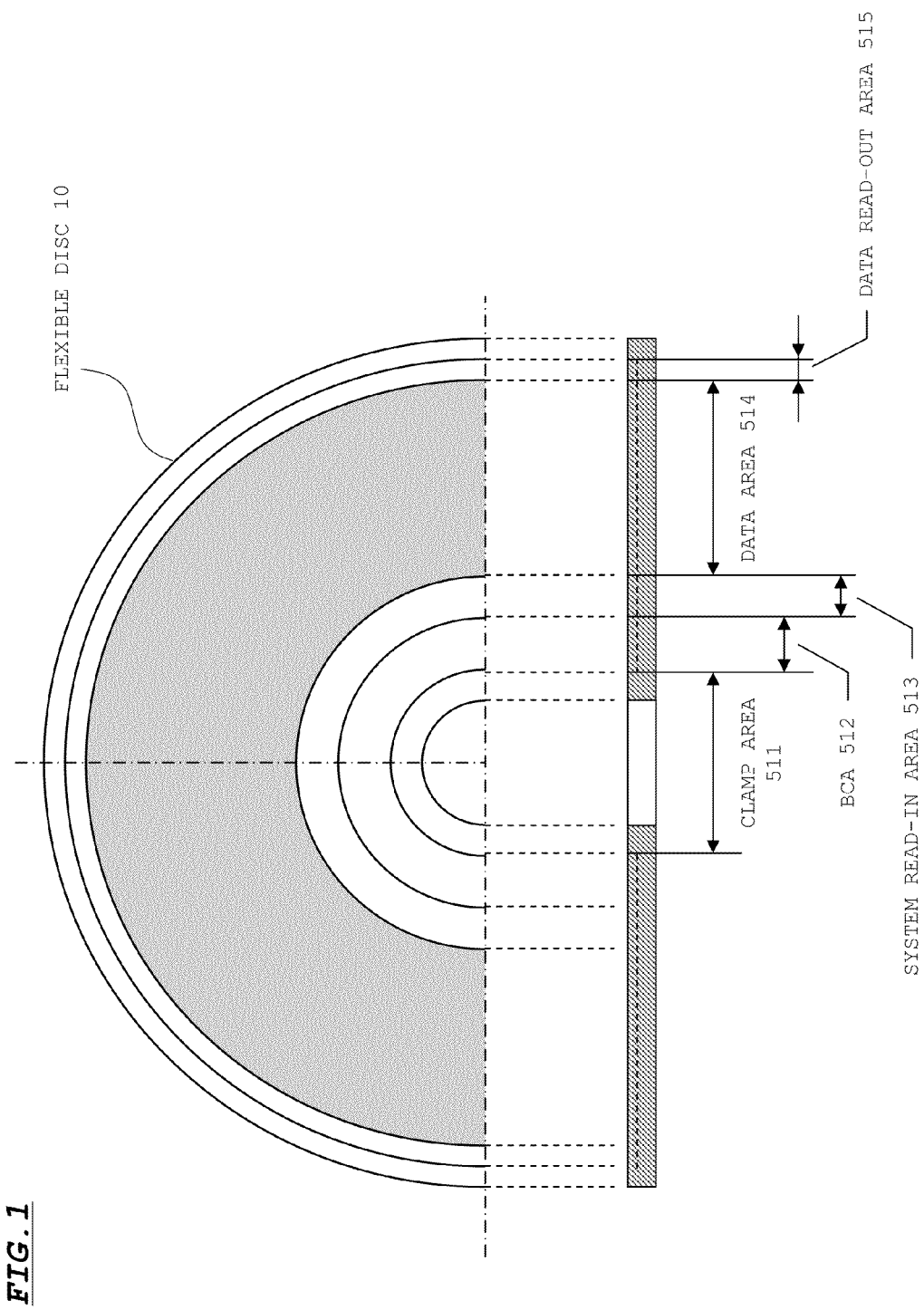
FIG. 1 is a diagram showing an area format of a flexible disc according to an embodiment of the invention.

The drawings are provided mainly for describing the present invention, and do not limit the scope of the present invention.

DESCRIPTION OF PREFERRED EMBODIMENTS

In the following, an embodiment of the invention is described referring to the drawings. The embodiment is directed to an arrangement, wherein the invention is applied to an optical disc device compatible with a flexible disc.

Structure and Feature of Disc

At first, the structure and the feature of a flexible disc to be used in this embodiment are described referring to FIGS. 1 through 4B.

FIG. 1 is a diagram showing an area format of a flexible disc 10 to be used in this embodiment.

The flexible disc 10 is divided into a plurality of areas in the order from an inner circumference thereof, i.e., a clamp area 511, a burst cutting area (BCA) 512, a system read-in area 513, a data area 514, and a data read-out area 515. Data to be read out by an optical pickup device is held in a region between the innermost circumferential portion of the BCA 512 and the outermost circumferential portion of the data read-out area 515.

The BCA 512 is recorded with BCA_ID, and information such as the book number of a written standard to which the disc conforms by partially erasing a flat recording layer along a disc circumferential direction. The BCA 512 is further recorded with a disc type, and a minimum rotation number (a smallest value representing a rotation number at which the flexible disc is usable). Erasing a recording layer is performed by e.g. a method of burning off the recording layer by a high-power laser.

When a beam spot is positioned on the BCA 512, a bright portion and a dark portion are generated in the light reflected from the BCA 512, depending on an erased portion and a non-erased portion of the recording layer. The information recorded in the BCA 512 is reproduced by demodulating a change between the bright portion and the dark portion. The disc type can be specified along with the book number, based on the reproduced information.

Since the minimum rotation number is recorded in the BCA 512, the optical disc device is allowed to discriminate the disc from other discs at an early stage of the operation. Specifically, since the BCA 512 is formed near the innermost circumference of the disc, the distance between the optical pickup device and the flexible disc 10 is easily secured, and a drawback such as plane displacement of the disc is relatively small. Accordingly, recording the minimum rotation number in the BCA 512 enables to quickly set the rotation number of the flexible disc 10 at a value equal to or larger than the minimum rotation number.

Since the area of the BCA 512 is limited, for instance, in the case where the minimum rotation number is defined at each radial position or address position, it is desirable to record the minimum rotation numbers in the system read-in area 513 capable of recording a larger amount of information. Thus, describing the minimum rotation number corresponding to the innermost circumferential portion of the disc in the BCA 512, and recording the minimum rotation number at each radial position or address position in the system read-in area 513 enable to efficiently and finely set the minimum rotation number with respect to a disc.

The system read-in area 513 is recorded with information relating to physical parameters (such as the pit size and the track pitch) of the disc by forming a pit train on a recording layer in a spiral manner. As described above, in the case where the minimum rotation numbers are defined at the respective radial positions or address positions, it is desirable to record the minimum rotation numbers in the system read-in area 513. The system read-in area 513 in this embodiment is not formed with a groove but is only formed with a pit train.

The data area 514 is formed with a groove in a spiral manner. Various data is recorded in the groove. The groove is wobbled in the disc radial direction, and physical addresses are held by the wobbles. Specifically, a phase modulating section for holding a physical address is inserted in a monotonous wobbling section at a predetermined period. When a beam scans the phase modulating section, the physical address in the groove is read and reproduced, based on a change in the intensity of light reflected on the phase modulating section. Data recording is performed from the disc inner circumference toward the disc outer circumference.

Similarly to the data area 514, the data read-out area 515 is formed with a groove in a spiral manner. Similarly to the data area 514, the groove in the data read-out area 515 is wobbled in the disc radial direction. The data read-out area 515 is recorded with readout data, and is formed with a test recording zone to be used by the optical disc device, but is not recorded with user data.

The system read-in area 513 is recorded with e.g. initial physical information of a disc, which is essentially required by the optical disc device. In view of this, the system read-in area 513 has a wider track pitch for easy readout, than the track pitch of the data area 514. The physical parameters of the disc to be used in this embodiment are shown in the following table.

|  | System read-in area | Data area System read-out area |
| --- | --- | --- |
| Data bit length | 0.36 μm | 0.153 μm |
| Channel bit length | 0.204 μm | 0.102 μm |
| Minimum pit length (2T) | 0.408 μm | 0.204 μm |
| Maximum pit length (13T) | 2.652 μm | 1.326 μm |
| Track pitch | 0.68 μm | 0.4 μm |

In performing a recording operation with respect to the flexible disc, the data area 514 is divided into a data read-in area and a user data area. The data read-in area is utilized for recording updated data of recorded information of the disc, or as a drive test area, for instance. User data including a file structure or the like is recorded in the user data area.

The data read-in area is also recorded with disc physical information which is recorded in the BCA 512 or the system read-in area 513, and information relating to the minimum rotation numbers. In this arrangement, reproducing from the data read-in area of a recorded disc enables to know all the information about the disc. Accordingly, the optical disc device can be quickly brought to a user data recordable/reproducible state, as compared with an arrangement of accessing to the entirety of the BCA 512 and the system read-in area 513.

In this embodiment, the BCA 512, the system read-in area 513, and the data read-in area, in which physical parameter information of a disc is recorded, and information necessary for an initial driving operation is held, are defined as an administration area.

Figure 2:
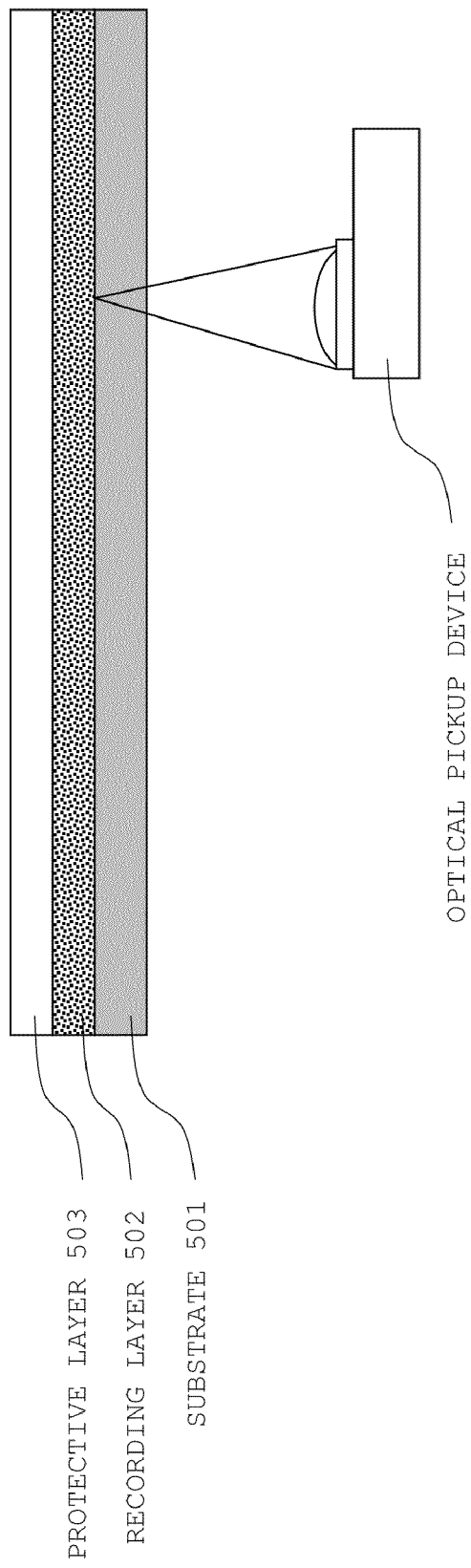
FIG. 2 is a diagram showing a cross-sectional structure of the flexible disc according to the embodiment.

FIG. 2 is a diagram showing a cross-sectional structure of the flexible disc 10. The flexible disc 10 has, in the order from a disc surface facing the optical pickup device, a substrate 501, a recording layer 502, and a protective layer 503.

The substrate 501 is made of a material capable of easily transmitting laser light of about 400 nm wavelength, such as polycarbonate. It is possible to use a biodegradable material containing polyolefin or polyacetate as a primary ingredient, as a material for forming the substrate 501. The substrate 501 is formed by injection molding, using a stamper having a track pattern (a pit train or a groove). The track pattern on the stamper is transferred to a surface of the substrate 501, and tracks are formed from the disc inner circumference toward the disc outer circumference. The substrate 501 has a thickness of 0.100 mm, and a refractive index of 1.6 (in case of 405 nm wavelength).

The recording layer 502 is made of a material having a high reflectance with respect to the wavelength of laser light to be used, such as aluminum, silver, or an alloy thereof, and is formed on the track pattern formed on the substrate 501. The material constituting the recording layer 502 is deposited in the form of a thin film on the substrate surface by sputtering, vapor deposition, or the like.

The protective layer 503 is formed by coating a UV curable resin by a spin-coat process or the like, and by curing the resin by UV irradiation in order to prevent degradation or damage of the material constituting the recording layer 502 from e.g. oxidation. A printed layer (not shown) or the like may be formed on the protective layer 503. In the modification, the user can easily discriminate a printed surface from a light incident surface on the side of the optical pickup device. In view of this, it is desirable to form a printed surface on the protective layer 503.

In this example, the thickness of the substrate 501 is set to 0.100 mm, and the refractive index is set to 1.6. The embodiment is not limited to the above example. As far as the substrate 501 has a property to be described later, the thickness of the substrate 501 may be set to any value capable of holding the recording layer 502 in the range from 0.040 mm to 0.600 mm. Further, as far as the substrate 501 can easily transmit laser light, the refractive index may be in the range from 1.5 to 1.7, in the case where the wavelength of laser light is in the range from 400 nm to 410 nm. In the case of using a disc such as CD, DVD, or BD, the entire thickness of the disc is about 1.2 mm.

Figure 3A:
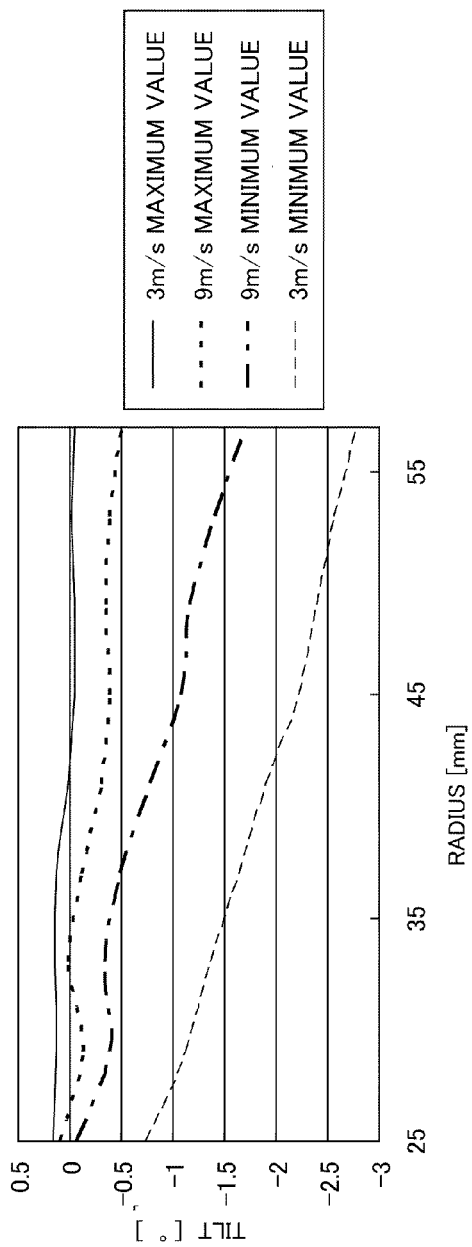
FIGS. 3A and 3B are diagrams showing measurement results, in the case where the flexible disc according to the embodiment is rotated.
Figure 3B:
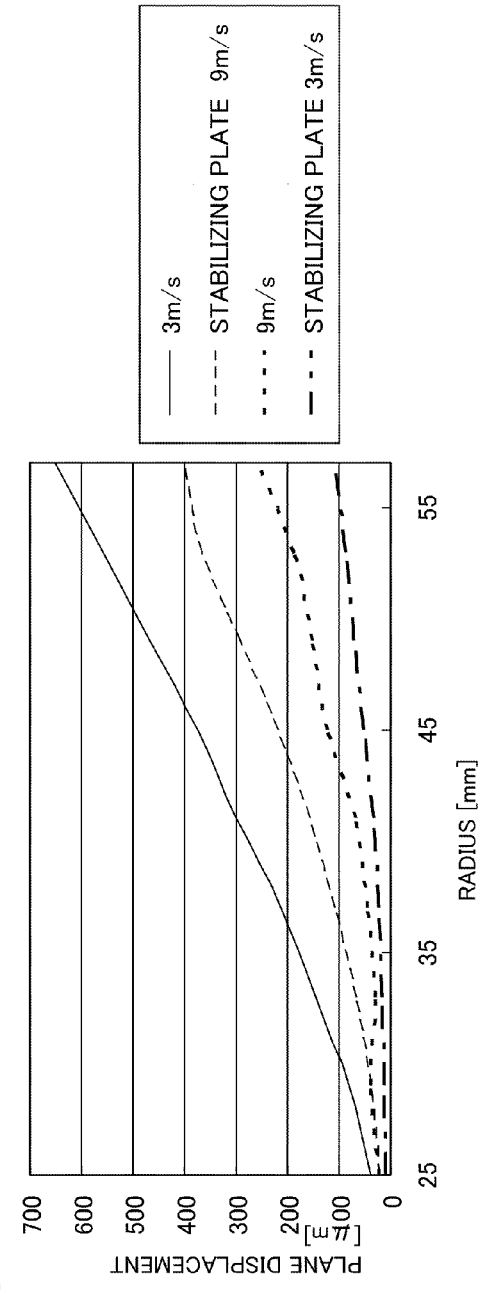

FIGS. 3A and 3B are diagrams showing measurement results on tilt and plane displacement amount of the flexible disc 10, in the case where the flexible disc 10 of 12 cm-diameter to be used in this embodiment is constantly rotated at a linear velocity of 3 m/s and 9 m/s. FIG. 3A is a diagram showing maximum values and minimum values of tilt at the respective radial positions, and FIG. 3B is a diagram showing plane displacement amounts at the respective radial positions. The graphs "stabilizing plate 3 m/s" and "stabilizing plate 9 m/s" in FIG. 3B show measurement results, in the case where a stabilizing plate to be described later is disposed opposite to a disc surface.

The measurement was performed in a state that the flexile disc was mounted without flexure, with a disc surface being aligned horizontally. The axis of ordinate in FIG. 3A shows a tilt angle of the disc surface with respect to a horizontal plane, and a minus value indicates that the disc surface is tilted in a gravitational direction with respect to the horizontal plane. The axis of ordinate in FIG. 3B shows a plane displacement amount in a vertical direction.

The measurement result in FIG. 3A shows that the disc is flexed in the gravitational direction, as the radial position is shifted toward the disc outer circumference. The measurement results in FIGS. 3A and 3B show that both of the tilt and the plane displacement amount are decreased, as the rotational speed is multiplied by three times (from 3 m/s to 9 m/s), and the tilt and the plane displacement amount are decreased in such a direction that a center value (a medium value between a maximum value and a minimum value) of tilt at each radial position is approximate to zero. The plane displacement amount at each radial position within the circumference tends to increase, as the radial position is shifted toward the disc outer circumference, and tends to decrease, as the rotational speed is increased.

Figure 4A:
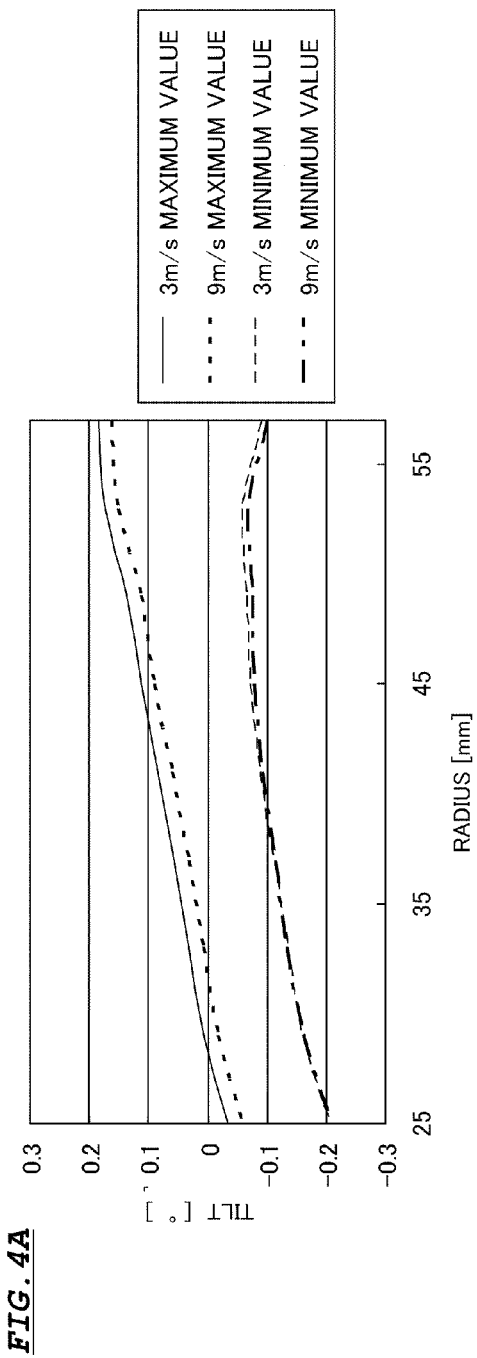
FIGS. 4A and 4B are diagrams showing measurement results, in the case where a CD and a BD are rotated.
Figure 4B:
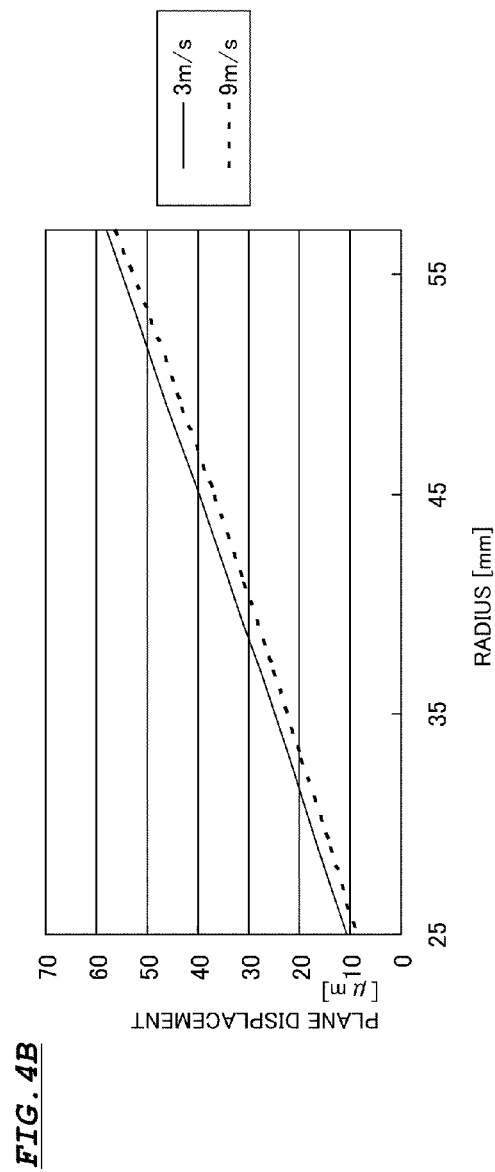

FIGS. 4A and 4B are diagrams showing measurement results of tilt and plane displacement amount of CD or BD as a general optical disc, in the case where the disc is rotated in the same manner as shown in FIGS. 3A and 3B. In this case, the tilt and the plane displacement amount are not greatly changed, even if the rotational speed of the disc is increased, and improvement on the plane displacement amount at the disc outermost circumference, resulting from an increase in the rotational speed, is very small.

In this example, assuming that the rotational speeds 3 m/s and 9 m/s are respectively defined as V3 and V9, and maximum tilt amounts (largest values out of absolute values of tilt angle with respect to a horizontal plane) at the radial R position when the rotational speeds are V3 and V9 are respectively defined as T(R)_3 and T(R)_9, a normalization value of a tilt variation $\Delta T/\Delta V$ with respect to a rotational speed is calculated by the following equation:

$$\Delta T/\Delta V=\{(T(R)\_3-T(R)\_9)/T(R)\_3\}/(V9-V3)$$

In a general optical disc, substituting the respective maximum tilt amounts in the above equation, in the case where the radius R=57 (mm), 45 (mm), and 33 (mm), yields tilt variations $\Delta T/\Delta V$=0.019, 0.033, and 0.00, respectively. On the other hand, in the flexible disc, substituting the respective maximum tilt amounts in the equation, in the case where the radius R=57 (mm), 45 (mm), and 33 (mm), yields tilt variations $\Delta T/\Delta V$=0.064, 0.086, and 0.125, respectively. Thus, in the flexible disc, as the rotational speed is increased by three times, the tilt variation $\Delta T/\Delta V$ is decreased by two times or more, as compared with the general optical disc, which shows remarkable improvement.

As described above, the flexible disc has a feature that the tilt variation is greatly improved by increasing the rotational speed. In the case where the tilt variation is calculated by the above equation, the tilt variation $\Delta T/\Delta V$ is at least 0.05 or more. Thus, the flexible disc has a feature that a tilt and a plane displacement are reduced, as the rotational speed is increased.

As a method for further suppressing plane displacement, there is proposed a method, wherein a flat glass plate having substantially the same diameter as the diameter of the flexible disc 10 is disposed on a side of the flexible disc opposite to the optical pickup device, away from a disc surface (a surface in a horizontal state) by 0.2 mm, as a stabilizing plate.

FIG. 3B shows a graph indicating plane displacement, in the case where the stabilizing plate is used. As shown in the corresponding graph in FIG. 3B, as compared with a case that a stabilizing plate is not used in FIG. 3B, plane displacement is greatly improved. Preferably, the stabilizing plate may be formed depending on e.g. the rotation number of a flexible disc to be used. Use of the stabilizing plate is effective in the case where the flexible disc is mounted at a position opposite to the optical pickup device.

The following table shows a simulation result on a natural resonance frequency of the flexible disc. Although the natural resonance frequency (the rotation number: 0 rpm) of the flexible disc in a stationary state greatly differs depending on the substrate thickness, a difference in the natural resonance frequency is decreased, as the rotation number is increased. The table shows that when the rotation number becomes 12,000 rpm, the natural resonance frequency is substantially the same between a substrate thickness of 0.1 mm and a substrate thickness of 1.2 mm.

The natural resonance frequency is also expressed by a function of the rigidity and the mass of a disc. Accordingly, it is clear that an increase in the rotation number of a disc having a substrate thickness of 0.1 mm increases the rigidity, and the rigidity in a high-speed rotation state is approximate to the rigidity of a disc having a substrate thickness of 1.2 mm. Actually, a flexible optical disc in an example of the present invention was rotated at 12,000 rpm. As a result of the experiment, the flexible optical disc was rotated without damage even after the rotational speed exceeded 10,000 rpm.

|  |  | Rotation number | | |
| --- | --- | --- | --- | --- |
|  |  | 0 rpm | 6,000 rpm | 12,000 rpm |
| Substrate thickness | 0.1 mm | 9.55 Hz | 154.39 Hz | 308.26 Hz |
|  | 1.2 mm | 114.27 Hz | 192.38 Hz | 329.59 Hz |

The system read-in information is recorded on the recording surface of the flexible disc 10, as pit information. Alternatively, similar information as described above may be recorded by using a frequency such as a wobbling frequency. Further, the track pitch of the disc is not limited to the above, but may be set depending on the laser wavelength or the objective lens to be used in the optical pickup device, as necessary. Setting the numerical aperture (NA) of the objective lens to 0.65 or more, and the laser wavelength to 410 nm or less enables to configure a higher-density optical disc in order to meet a demand for a high-density optical disc. In the above arrangement, since the distance between the optical pickup device and the disc is further reduced, if the disc is flexed, it is highly likely that the disc may be contacted with the optical pickup device. As will be described later, however, in this embodiment, the contact of the disc with the optical pickup device can be avoided even in the above arrangement.

In the flexible disc 10, the minimum rotation numbers are recorded in the BCA 512 and the system read-in area 513. As far as intended information can be read out using the optical disc device when needed, for instance, information may be recorded only in the system read-in area 513. In the modification, it is necessary to securely reproduce the information from the system read-in area 513.

In the embodiment, the flexible disc 10 is a recordable disc capable of recording user data. Alternatively, the flexible disc 10 may be a disc having data to be reproduced only by e.g. forming a track having a series of pits.

The structure of the recording layer may be a multilayer structure. In the modification, it is desirable to record the minimum rotation numbers or the like on a disc inner circumference, where tilt or plane displacement is less likely to occur. In particular, multiple types of optical discs are mountable in an optical disc device compatible with the other optical discs such as DVD and BD. Accordingly, it is necessary to discriminate the discs from one another quickly and safely as much as possible. In view of this, it is desirable to record the minimum rotation numbers on the innermost circumferential portion of the disc.

EXAMPLES

Figure 5:
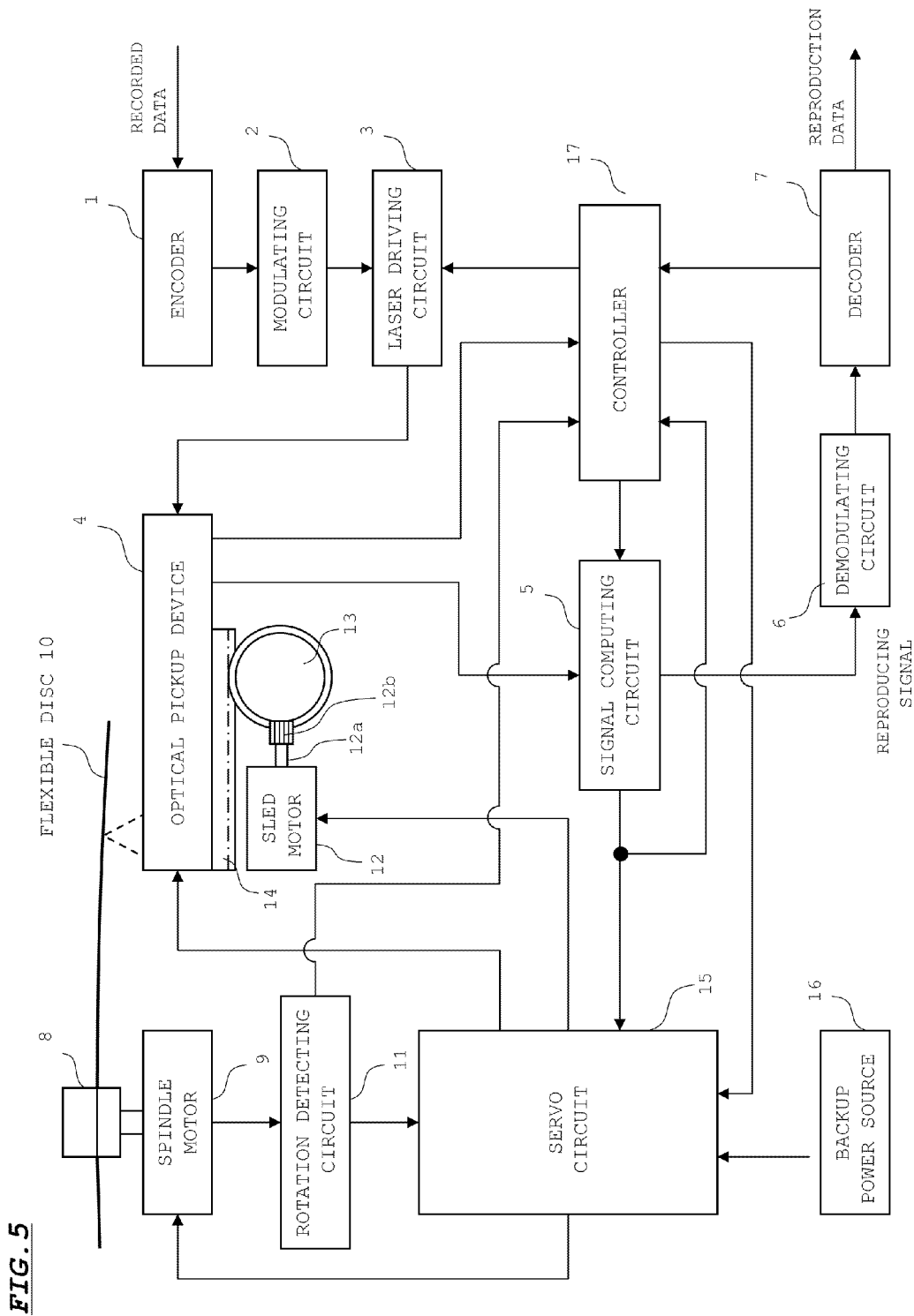
FIG. 5 is a diagram showing an arrangement of essential parts in the embodiment.

FIG. 5 is a diagram showing an arrangement of essential parts of the optical disc device. As shown in FIG. 5, the optical disc device includes an encoder 1, a modulating circuit 2, a laser driving circuit 3, an optical pickup device 4, a signal computing circuit 5, a demodulating circuit 6, a decoder 7, a spindle 8, a spindle motor 9, a rotation detecting circuit 11, a sled motor 12, a servo circuit 15, a backup power source 16, and a controller 17.

The flexible disc 10 is a flexible disc having the above structure. As described above, the minimum rotation numbers are recorded in the administration area formed on the inner circumferential portion of the disc. In this example, the minimum rotation number is an index to be used in suspending a recording/reproducing operation, and retracting the optical pickup device 4. The minimum rotation number is set to a value larger than the rotation number, which may cause contact of the flexible disc 10 with the optical pickup device 4 by flexure of the flexible disc 10, and a value smaller than the rotation number of the flexible disc 10 to be used at the time of a recording/reproducing operation.

The encoder 1 performs an encoding process such as adding an error correction code to inputted recorded data, and outputs the encoded data to the modulating circuit 2. The modulating circuit 2 modulates the inputted recorded data, generates a recording signal, and outputs the recording signal to the laser driving circuit 3.

The laser driving circuit 3 drives a semiconductor laser (not shown) provided in the optical pickup device 4 in response to a command from the controller 17. Specifically, upon receiving a recording command from the controller 17, the laser driving circuit 3 drives the semiconductor laser to modulate laser light in accordance with a recording signal to be inputted from the modulating circuit 2. At the time of a reproducing operation, the laser driving circuit 3 drives the semiconductor laser to emit laser light of a predetermined power.

As shown in FIG. 5, the optical pickup device 4 is disposed below the flexible disc 10. The optical pickup device 4 has a well-known conventional optical system. The optical pickup device 4 is supported to be movable in radial direction of the flexible disc 10. A support mechanism of the optical pickup device 4 will be described later, referring to FIGS. 6A through 6D.

The signal computing circuit 5 performs a computing process on an output signal from a light detecting section provided in the optical pickup device 4, generates a reproduction RF signal, a focus error signal, a tracking error signal, and a tilt error signal, and outputs these signals to the respective corresponding circuits.

The demodulating circuit 6 demodulates the reproduction RF signal inputted from the signal computing circuit 5 into reproduction data, and outputs the reproduction data to the decoder 7. The decoder 7 performs a decoding process such as error correction with respect to the reproduction data inputted from the demodulating circuit 6, and outputs the decoded data to a circuit (not shown) provided posterior to the decoder 7. The decoder 7 also outputs data reproduced from the administration area on the flexible disc 10 to the controller 17.

The spindle 8 supports the flexible disc 10, and rotates the flexible disc 10 at a predetermined rotation number. The spindle motor 9 rotatably drives the spindle 8 in response to a command from the servo circuit 15. The spindle motor 9 also outputs a reference signal to the rotation detecting circuit 11 each time the spindle 8 makes one turn.

The rotation detecting circuit 11 detects the rotation number of the spindle 8, based on a reference signal to be outputted from the spindle motor 9. The detected rotation number is outputted to the servo circuit 15 and the controller 17. The inventive example has an arrangement, wherein a reference signal is outputted from the spindle motor 9, each time the spindle 8 makes one turn. Alternatively, as far as the rotation number of the spindle 8 can be detected, e.g. three hundred and sixty signals may be outputted each time the spindle 8 makes one turn.

The sled motor 12 has a motor gear support shaft 12a and a motor gear 12b. The sled motor 12 rotates the motor gear 12b through the motor gear support shaft 12a. A wheel gear 13 has a gear portion on an outer surface thereof to be engaged with the motor gear 12b, and is rotated in accordance with rotation of the motor gear 12b.

A rack gear 14 is fixed to the optical pickup device 4 in such a manner as to extend in parallel to a moving direction of the optical pickup device 4. The rack gear 14 is engaged with a gear portion formed on a circumferential surface of the wheel gear 13, and is driven in radial direction of the flexible disc 10 in accordance with rotation of the wheel gear 13. With this arrangement, driving the sled motor 12 in response to a command from the servo circuit 15 allows the optical pickup device 4 to be driven in radial direction of the flexible disc 10.

The servo circuit 15 controls the spindle motor 9, based on an output signal from the rotation detecting circuit 11 or the signal computing circuit 5. At the time of starting the rotation of the flexible disc 10, at first, the servo circuit 15 monitors an output signal from the rotation detecting circuit 11, and increases the rotation number of the spindle motor 9 until the rotation number of the flexible disc 10 becomes equal to a predetermined rotation number. Thereafter, the servo circuit 15 monitors a reproduction RF signal to be inputted from the signal computing circuit 5, and controls the rotation number of the spindle motor 9 until a synchronizing signal to be acquired from the reproduction RF signal has a predetermined period. The rotation control of the spindle motor 9 may be performed by using various methods, depending on the track structure of the flexible disc 10, other than the above method using a synchronizing signal.

The servo circuit 15 outputs a drive signal to the sled motor 12 in response to a command from the controller 17. Further, the servo circuit 15 controls an objective lens actuator (not shown) provided in the optical pickup device 4, based on a focus error signal, a tracking error signal, and a tilt error signal inputted from the signal computing circuit 5. Furthermore, the servo circuit 15 monitors a reproducing signal to be inputted from the signal computing circuit 5, and controls an actuator (not shown) provided in the optical pickup device 4 to optimize the reproducing signal.

The backup power source 16 supplies an electric power to the servo circuit 15, in the case where power supply to the optical disc device is cutoff. Specifically, in the case where power supply to the optical disc device is normal, the backup power source 16 stores an emergency electric power in advance, and supplies the emergency electric power to the servo circuit 15, in the case where the power supply to the optical disc device is cut off. The backup power source may be a rechargeable battery such as a lithium ion battery, or a device for accumulating electric charges such as a capacitor.

The controller 17 issues a command to the laser driving circuit 3, the signal computing circuit 5, and the servo circuit 15, based on a signal to be inputted from the optical pickup device 4, the signal computing circuit 5, the decoder 7, and the rotation detecting circuit 11. Further, the controller 17 holds a minimum rotation number read from the flexible disc 10.

Figure 6A:
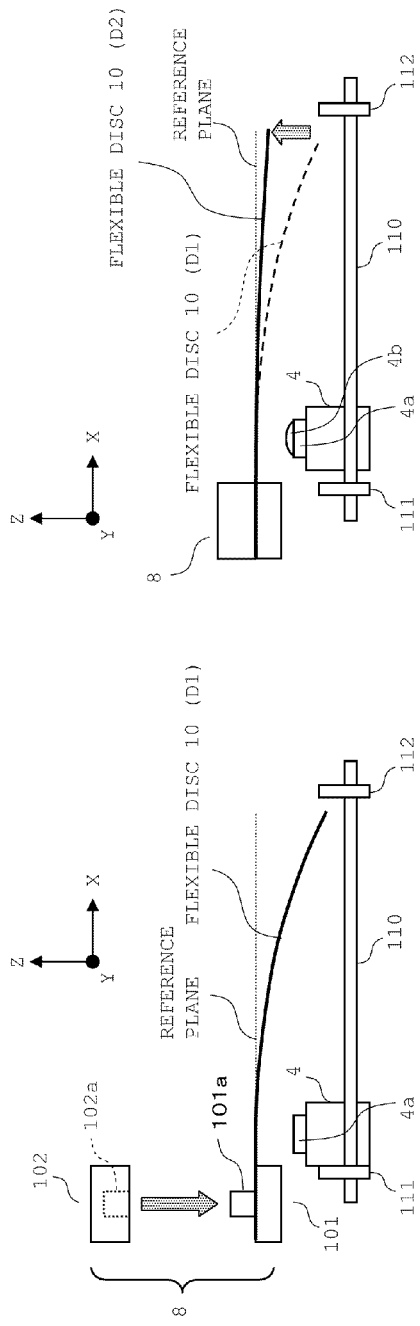
FIGS. 6A through 6D are diagrams showing an arrangement and an operation in the embodiment.
Figure 6B:
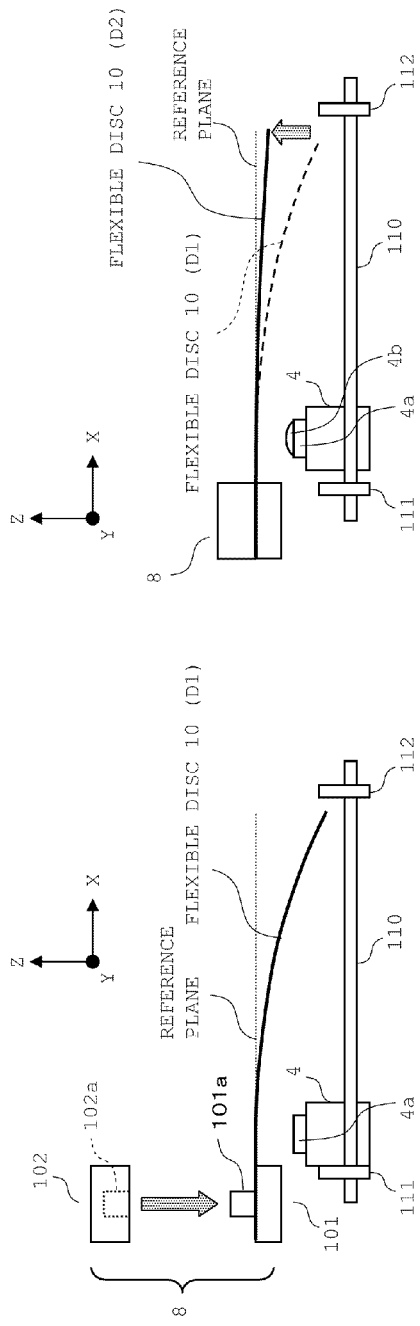

FIGS. 6A through 6D are diagrams schematically showing a series of operations of retracting the optical pickup device 4, in the case where power supply to the optical pickup device is cut off. FIG. 6A is a diagram showing a state that the flexible disc 10 is fixedly mounted on the spindle 8. FIG. 6B is a diagram showing a state that the flexure of the flexible disc 10 is changed, as the rotation number of the spindle 8 is changed.

Figure 6C:
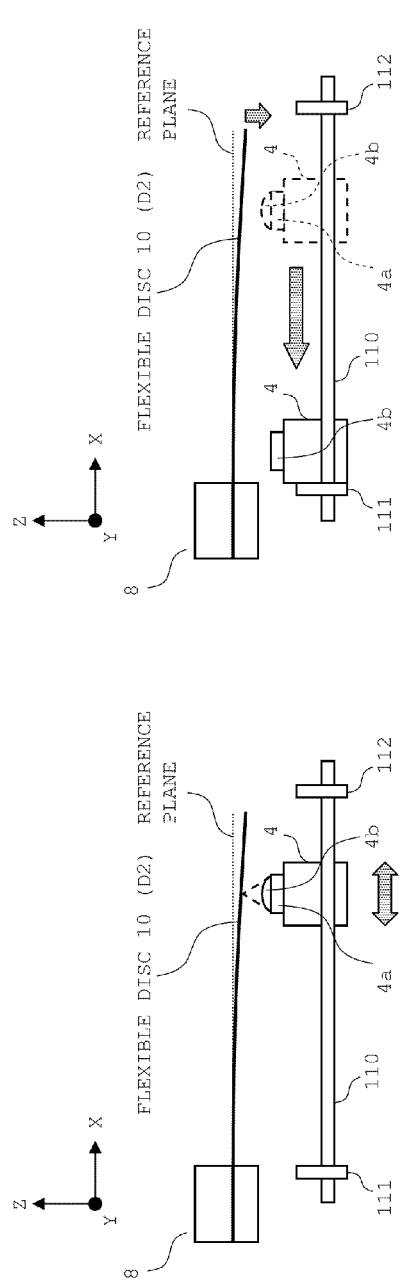
Figure 6D:
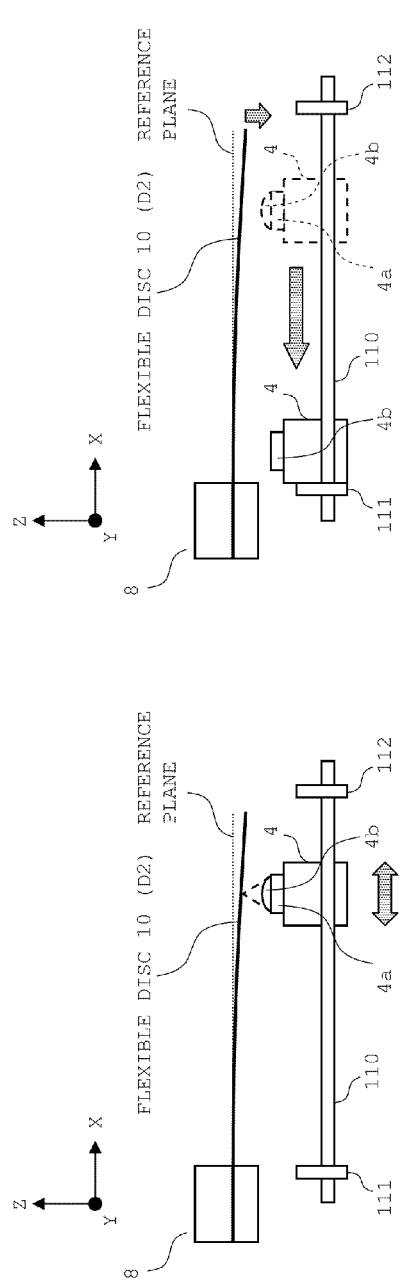

FIG. 6C is a diagram showing a state that a recording and/or reproducing operation is performed by the optical pickup device 4. FIG. 6D is a diagram showing a state that the optical pickup device 4 is retracted in the case where power supply is cut off.

In FIGS. 6A through 6D, the direction along which the gravitational force is applied is aligned with the minus Z-axis direction. FIGS. 6A through 6D are diagrams each showing the flexible disc 10 and the optical pickup device 4 in Y-axis direction (viewed from the outer circumference of the flexible disc toward the inner circumference thereof). Further, X-axis direction is aligned with the disc radial direction.

Referring to FIG. 6A, at first, the arrangements of the flexible disc 10 and the optical disc device 4 are described.

The spindle 8 includes a turntable 101 and a clamper 102. The turntable 101 has a protrusion 101a on an upper surface thereof, and the clamper 102 has a recess 102a in a lower surface thereof. The turntable 101 is rotated about Z axis in accordance with driving of the spindle motor 9.

When the flexible disc 10 is fixedly mounted on the spindle 8, at first, a center hole of the flexible disc 10 is placed onto the turntable 101 from above, with a lower surface of the flexible disc 10 serving as a recording surface of the flexible disc 10. Thereafter, the clamper 102 is moved toward the turntable 101 from above the turntable 101, and the protrusion 101a is fitted in the recess 102a, whereby the flexible disc 10 is fixedly mounted on the spindle 8. Then, as the spindle motor 9 is driven, the turntable 101 is rotated, and the flexible disc 10 is stably rotated. The clamper 102 fixedly holds the disc 10 with such an adequate pressure as not to damage the disc. For instance, the pressure to be applied to the flexible disc 10 by the clamper 102 is in the range from about 1 to 3N. With a pressure of 2N, the flexible disc 10 can be stably rotated even at 10,000 rpm.

As shown in FIG. 6A, when rotation of the disc 10 is suspended, the flexible disc 10 has a flexed shape (hereinafter, called as a "shape D1") by the gravitational force. Specifically, assuming that an upper surface (a plane in parallel to X-Y plane) of a central portion of the disc fixedly mounted on the spindle 8 is a reference plane (indicated by the dotted line in FIG. 6A), the flexible disc 10 is flexed downwardly with respect to the reference plane by the gravitational force in the disc radial direction from the inner circumference of the flexible disc 10 toward the outer circumference thereof.

A shaft 110 is disposed at such a position that the optical pickup device 4 is driven from the inner circumference of the flexible disc 10 to the outer circumference thereof along the radial direction of the flexible disc 10. The shaft 110 has a stopper 111 at a position corresponding to the innermost circumferential portion of the flexible disc 10, and has a stopper 112 at a position corresponding to the outermost circumferential portion thereof. The optical pickup device 4 has an engaging portion to be slidably engaged with the shaft 110, and is movably supported on the shaft 110 through the engaging portion. Accordingly, the optical pickup device 4 is moved between the stoppers 111 and 112 along the shaft 110, and is driven by the sled motor 12 from the position corresponding to the innermost circumferential portion of the flexible disc 10 toward the position corresponding to the outermost circumferential portion thereof.

The optical pickup device 4 has an actuator cover 4a on the outside of the objective lens actuator provided in the optical pickup device 4. The actuator cover 4a has an opening (not shown) opened in the upward direction, and the objective lens actuator and an objective lens (not shown) are housed in the actuator cover 4a. The objective lens is positioned at a lower position than an upper end of the actuator cover 4a, when the optical disc device 4 is suspended. The optical pickup device 4 is positioned at the position corresponding to the innermost circumferential portion of the flexible disc 10 in an initial state. In this arrangement, there is no likelihood that the optical pickup device 4 may be contacted with the flexible disc 10.

Next, a procedure of a recording and/or reproducing operation with respect to a recording surface of the flexible disc 10 is described.

Referring to FIG. 6B, as described above, the flexible disc 10 has the shape D1 (the shape indicated by the broken line in FIG. 6B) in a suspended state. When the flexible disc 10 is rotated from this state by the spindle motor 9, the flexible disc 10 gradually comes close to the reference plane by centrifugal force. When the rotation number of the spindle motor 9 reaches a predetermined value, the flexible disc 10 is brought to a state (hereinafter, called as a "shape D2") where the shape of the flexible disc 10 is approximate to the reference plane.

When the shape of the flexible disc 10 is stabilized as the shape D2, administration information (including the minimum rotation number) recorded in the administration area formed near the inner circumference of the flexible disc 10 is read. Specifically, at first, in response to driving of the sled motor 12, the optical pickup device 4 is moved to a targeted position (a position corresponding to the administration area) along the shaft 110. Thereafter, the objective lens 4b is driven in the upward direction from the upper end surface of the actuator cover 4a, and focus control is performed by the optical system provided in the optical pickup device 4, whereby the administration information is read. The read administration information (including the minimum rotation number) is held by the controller 17.

Subsequently, referring to FIG. 6C, the optical pickup device 4 is driven to a position to be recorded and/or reproduced along the shaft 110. Thereafter, focus control is performed with respect to a targeted recording/reproducing position. Then, a recording and/or reproducing operation with respect to the flexible disc 10 is performed, while executing various servo controls.

As described above, when the optical pickup device 4 is driven, contact of the flexible disc 10 with the optical pickup device 4 is avoided. In other words, since the optical pickup device 4 is moved after the shape of the flexible disc 10 is changed from the shape D1 to the shape D2, there is no likelihood that the flexible disc 10 may be contacted with the optical pickup device 4.

Next, an operation to be executed in the case where power supply to the optical disc device 4 is cut off is described.

Referring to FIG. 6D, let it be assumed that the optical pickup device 4 is under a recording and/or reproducing operation at the position indicated by the broken line at a point of time when power supply to the optical disc device is cut off.

When the power supply is cut off, an emergency electric power is supplied from the backup power source 16 shown in FIG. 5 to the servo circuit 15. In response to supply of the electric power from the backup power source 16, the servo circuit 15 drives the spindle motor 9 to retain the rotation number of the flexible disc 10. Specifically, the servo circuit 15 outputs, to the spindle motor 9, a drive signal which has been supplied to the spindle motor 9 immediately before the power supply is cut off to keep the rotation number of the flexible disc 10 from falling below the aforementioned minimum rotation number.

In response to cut off of the power supply, servo control by the servo circuit 15 is turned off. Specifically, focus servo control, tracking servo control, and tilt servo control are turned off, and rotation servo control of the spindle 8 based on a synchronizing signal is suspended. Accordingly, the objective lens 4b is deprived of a supporting force, and is retracted downwardly from the upper end of the actuator cover 4a, as the initial position. Although the rotation servo control by the spindle motor 9 is suspended, the flexible disc 10 continues its rotation at a rotation number equal to or larger than the minimum rotation number, because the rotation number is retained by the servo circuit 15, as described above.

Further, the servo circuit 15 drives the sled motor 12 to retract the optical pickup device 4 to the position corresponding to the innermost circumferential portion of the flexible disc 10. Specifically, the optical pickup device 4 is driven from the position indicated by the broken line in FIG. 6D to the position corresponding to the innermost circumferential portion of the flexible disc 10, as indicated by the solid line in FIG. 6D.

Arrival of the optical pickup device 4 at the position corresponding to the innermost circumferential portion of the flexible disc 10 is detected by, e.g., a limit switch provided near the position corresponding to the innermost circumferential portion of the flexible disc 10. In this case, the limit switch is turned on by the backup power source 16. A detection signal from the limit switch is outputted to the servo circuit 15.

When the optical pickup device 4 is moved to the position corresponding to the innermost circumferential portion of the flexible disc 10, the limit switch is turned on, and driving of the spindle motor 9 is suspended. Accordingly, the shape of the flexible disc 10 is changed from the shape D2 to the shape D1.

As described above, even if power supply to the optical disc device is cut off, the optical pickup device 4 is retracted to the position corresponding to the innermost circumferential portion of the flexible disc 10, before the flexible disc 10 is flexed downwardly and comes into a driving area of the optical pickup device 4. This enables to avoid contact of the flexible disc 10 with the optical pickup device 4. Further, in the case where power supply is cut off, the objective lens 4b is retracted downwardly from the upper end of the actuator cover 4a. This enables to securely avoid contact of the flexible disc 10 with the objective lens 4b.

Figure 7:
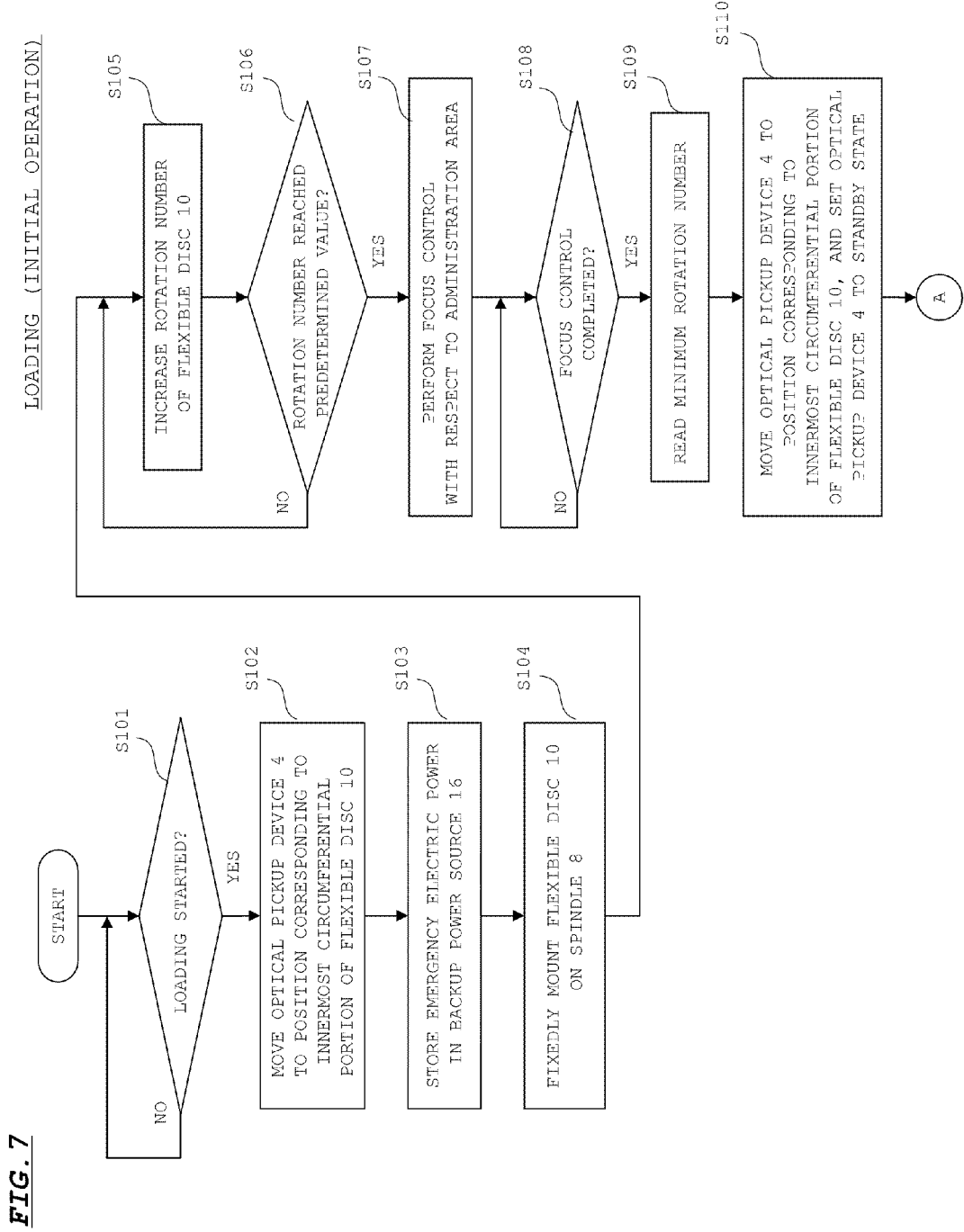
FIG. 7 is a flowchart showing a control flow to be executed in loading the flexible disc to be used in the embodiment.

FIG. 7 is a flowchart showing a loading operation, as an initial operation to be performed by the optical pickup device 4.

If it is judged that loading of the flexible disc 10 with respect to the optical disc device has been started in Step S101 (YES in Step S101), the routine proceeds to Step S102, and if it is judged that loading has not been started (NO in Step S101), the routine returns to Step S101. In other words, the control flow is waited in Step S101 until a loading operation of the flexible disc 10 by the user is started.

In Step S102, the optical pickup device 4 is moved to the position corresponding to the innermost circumferential portion of the flexible disc 10. As will be described later, normally, the optical pickup device 4 is located at the position corresponding to the innermost circumferential portion of the flexible disc 10 at the time when a preceding operation has been terminated. In this example, the optical pickup device 4 is moved to the position corresponding to the innermost circumferential portion of the flexible disc 10 for a checkup operation. This enables to securely avoid contact of the flexible disc 10 with the optical pickup device 4.

Then, an electric power is stored in the backup power source 16 in Step S103. Then, the flexible disc 10 inserted in the optical disc device is fixedly mounted on the spindle 8, as the loading operation is proceeded in Step S104. The shape of the flexible disc 10 in this state is the shape D1 as shown in FIG. 6A.

Then, the rotation number of the flexible disc 10 is increased by the spindle motor 9 in Step S105. Then, it is judged whether the rotation number of the flexible disc 10 has reached a predetermined value in Step S106. The judgment is made based on an output signal from the rotation detecting circuit 11 which detects the rotation number from the spindle motor 9. If it is judged that the rotation number has reached the predetermined value (YES in Step S106), the routine proceeds to Step S107, and if it is judged that the rotation number has not reached the predetermined value (NO in Step S106), the routine returns to Step S105 to further increase the rotation number of the flexible disc 10. When the rotation number has reached the predetermined value, the shape of the flexible disc 10 is the shape D2 as shown in FIG. 6B.

Then, the optical pickup device 4 is moved along the shaft 110 for focus control with respect to the administration area formed near the inner circumference of the flexible disc 10 in Step S107.

Then, if it is judged that focus control with respect to the administration area has been completed in Step S108 (YES in Step S108), the routine proceeds to Step S109, and if it is judged that focus control has not been completed (NO in Step S108), the routine returns to Step S107 to perform focus control until the focus control is completed. After completion of focus control, various servo controls such as tracking servo control are executed, as necessary.

Then, the administration information (including the minimum rotation number) recorded in the administration area is read by the optical system in the optical pickup device 4 in Step S109. The administration information is held by the controller 17.

Then, the optical pickup device 4 is moved to the position corresponding to the innermost circumferential portion of the flexible disc 10, and set to a standby state for a recording and/or recording operation in Step S110. The connector A following Step S110 in FIG. 7 is identical to the connector A in FIG. 8.

Figure 8:
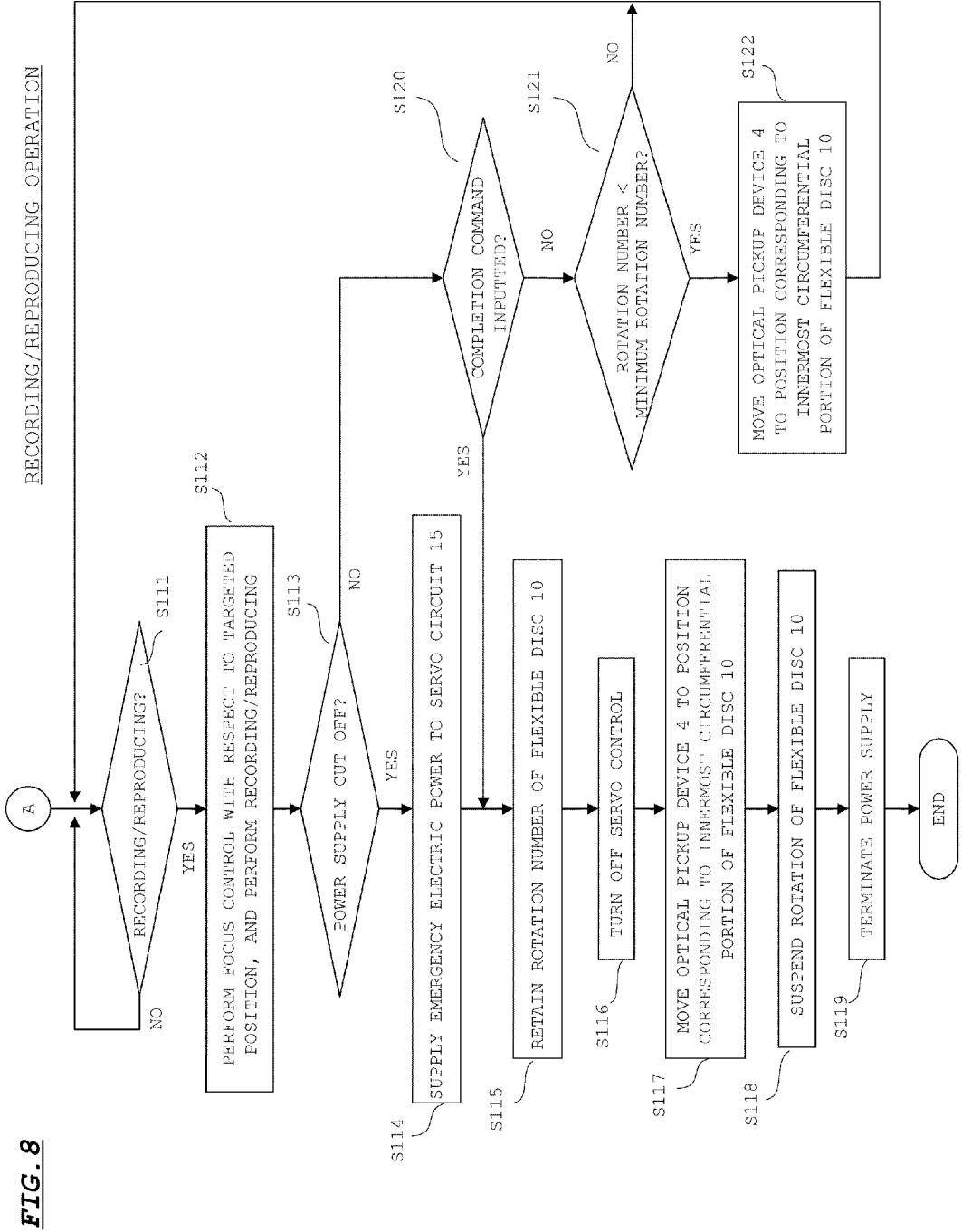
FIG. 8 is a flowchart showing a control flow of a recording and/or reproducing operation by an optical pickup device in the embodiment.

FIG. 8 is a flowchart showing a recording and/or reproducing operation with respect to the flexible disc 10.

After Step S110 in FIG. 7, it is judged whether a recording and/or reproducing operation with respect to the flexible disc 10 is performed, based on a command input from the user in Step S111. If it is judged that a recording and/or reproducing operation is performed (YES in Step S111), the routine proceeds to Step S112, and if it is judged that a recording and/or reproducing operation is not performed (NO in Step S111), the routine returns to S111, and the control flow is waited until a command on a recording and/or reproducing operation is inputted.

In Step S112, the optical pickup device 4 is driven to a targeted position, and after focus control, and various servo controls such as tracking servo control are performed, a recording and/or reproducing operation with respect to the flexible disc 10 is performed. This state is shown in FIG. 6C.

Then, it is judged whether power supply to the optical disc device is cut off. If it is judged that power supply is cut off in Step S113 (YES in Step S113), the routine proceeds to Step S114. If it is judged that power supply to the optical disc device is not cut off (NO in Step S113), the routine proceeds to Step S120.

In Step S114, an emergency electric power to be supplied from the backup power source 16 is supplied to the servo circuit 15. The servo circuit 15 outputs a drive signal to a corresponding circuit, using the supplied emergency electric power. A sufficient electric power to be used in the succeeding steps is stored in advance in the backup power source 16.

Then, as described above, the spindle motor 9 is driven by the servo circuit 15 to retain the rotation number of the flexible disc 10 in Step S115. Accordingly, the flexible disc 10 keeps the shape D2 as shown in FIG. 6D.

Then, the servo control by the servo circuit 15 is turned off in Step S116. Specifically, as described above, focus servo control, tracking servo control, tilt servo control, and rotation servo control of the spindle 8 are suspended.

Then, the sled motor 12 is driven by the servo circuit 15 in Step S117 to move the optical pickup device 4 to the position corresponding to the innermost circumferential portion of the flexible disc 10. The optical pickup device 4 in a state that the movement thereof is completed is shown by the solid line in FIG. 6D.

After the optical pickup device 4 is moved to the position corresponding to the innermost circumferential portion of the flexible disc 10, rotation of the flexible disc 10 is suspended in Step S118. The flexible disc 10 in a rotation suspended state has the shape D1 as shown in FIG. 6A.

Then, supply of the emergency electric power from the backup power source 16 to the servo circuit 15 is terminated in Step S119. Accordingly, the power supply to the entirety of the optical disc device is terminated, and the control flow is ended.

There is a likelihood that power supply may be cut off in an initial operation shown in FIG. 7. In the case where power supply is cut off during a readout operation of administration information in Steps S107 through S109 in FIG. 7, control operations shown in Step S113 through S122 in FIG. 8 are executed. Further, in this example, after movement of the optical pickup device 4 to the position corresponding to the innermost circumferential portion of the flexible disc 10 is completed, and rotation of the flexible disc 10 is suspended, power supply from the backup power source 16 is terminated. Alternatively, the backup power source may be so configured as to supply an electric power minimally required for retracting the optical pickup device 4, before the rotation of the flexible disc 10 is lowered to such a degree that the flexible disc 10 is contacted with the optical pickup device 4, in the case where power supply is cut off. In the modification, it is sufficient to supply an electric power capable of returning the optical pickup device 4 from the position corresponding to the outermost circumferential portion of the flexible disc 10 to the position corresponding to the innermost circumferential portion thereof, which is a longest distance.

In the flowchart shown in FIG. 8, there is provided a processing step of retracting the optical pickup device 4, in the case where the rotation number of the flexible disc 10 is unintentionally lowered during a power supply operation due to a failure of the spindle motor 9 or the like, other than the power supply cutoff.

Specifically, if it is judged that power supply is continued in Step S113 (NO in Step S113), it is judged whether the user has inputted a command of terminating the optical disc device in Step S120. If it is judged that the termination command has been inputted (YES in Step S120), the routine proceeds to Step S115, and if it is judged that the termination command has not been inputted (NO in Step S120), the routine proceeds to Step S121. In the case where the routine proceeds to Step S115, the servo circuit 15 executes the process after Step S115, using an ordinary power source, without using the electric power from the backup power source 16.

In Step S121, the controller 17 judges whether the rotation number of the flexible disc 10 is smaller than the minimum rotation number in the administration information held by the controller 17. The servo circuit 15 performs rotation servo control, using a reproduction RF signal (a synchronizing signal) to be outputted from the signal computing circuit 5 at the time of a recording/reproducing operation. The controller 17 judges whether the rotation number of the flexible disc 10 becomes smaller than the minimum rotation number, by comparing a detection signal (the rotation number) to be supplied from the rotation detecting circuit 11 with the minimum rotation number in the administration information during the servo control operation.

If it is judged that the rotation number of the flexible disc 10 is smaller than the minimum rotation number in Step S121 (YES in Step S121), the routine proceeds from Step 121 to Step S122, and if it is judged that the rotation number is not smaller than the minimum rotation number (NO in Step S121), the routine returns to Step S111 to continue the recording and/or reproducing operation.

Examples of the case where the rotation number becomes smaller than the minimum rotation number are a case that the rotation detecting circuit 11 is incapable of detecting a rotation pulse to be outputted from the spindle motor 9, and a case that the optical disc device is tilted, with the result that an unexpected load is applied to the spindle 8. In the former case, rotation servo control using a synchronizing signal can be properly performed by the servo circuit 15. Accordingly, in this case, the routine may proceed to Step S111 to continue the recording and/or reproducing operation, without proceeding from Step S121 to Step S122.

In Step S122, a command of suspending the recording and/or reproducing operation, and moving the optical pickup device 4 to the position corresponding to the innermost circumferential portion of the flexible disc 10 is outputted from the controller 17 to the servo circuit 15. Specifically, if the rotation number of the flexible disc 10 is smaller than the minimum rotation number, the flexible disc 10 may be contacted with the optical pickup device 4. In view of this, the optical pickup device 4 is moved to the position corresponding to the innermost circumferential portion of the flexible disc 10 to securely avoid contact of the flexible disc 10 with the optical pickup device 4. Thereafter, the routine returns to Step S111, and waits for resuming the recording and/or reproducing operation.

In Step S122, after the recording and/or reproducing operation is suspended, and the optical pickup device 4 is moved to the position corresponding to the innermost circumferential portion of the flexible disc 10, the recording and/or reproducing operation is resumed in Step S111 (YES in Step S111). Then, the rotation number of the flexible disc 10 is increased, and it is judged whether the rotation number has reached the predetermined number in Step S112. In other words, in this case, the control flow from Step S105 through Step S108 in FIG. 7 is executed. If it is judged that the rotation number of the flexible disc 10 has not reached the predetermined value (NO in Step S106), the routine does not proceed to the recording and/or reproducing operation. This arrangement enables to perform a recording and/or reproducing operation with respect to the flexible disc 10, only if the rotation failure as a judgment result in Step S121 is eliminated at the time of resuming the recording and/or reproducing operation to be performed in a succeeding step.

As described above, in the inventive example, contact of the flexible disc 10 with the optical pickup device 4 can be avoided in advance, even if power supply to the optical disc device is cut off at the time of a recording and/or reproducing with respect to the flexible disc 10. This enables to suppress damage of the flexible disc 10 and the optical pickup device 4.

Further, in the inventive example, the optical pickup device 4 can be retracted to the position corresponding to the innermost circumferential portion of the flexible disc 10, in the case where the rotation number of the flexible disc 10 becomes smaller than the minimum rotation number at the time of a recording and/or reproducing operation with respect to the flexible disc 10, with the result that the flexible disc 10 is likely to be flexed downwardly from the shape D2. This enables to securely avoid contact of the flexible disc 10 with the optical pickup device 4.

Further, in the inventive example, in the case where the optical pickup device 4 is retracted to the position corresponding to the innermost circumferential portion of the flexible disc 10, the objective lens 4b is retracted in the actuator cover 4a. This enables to avoid contact of the flexible disc 10 with the objective lens 4b, as well as avoiding contact of the flexible disc 10 with the optical pickup device 4.

Further, in the inventive example, in the case where power supply to the optical disc device is cut off, the rotation number of the flexible disc 10 is retained by supply of an emergency electric power stored in the backup power source 16, and the optical pickup device 4 is retracted to the position corresponding to the innermost circumferential portion of the flexible disc 10. This enables to securely suppress contact of the optical pickup device 4 with the flexible disc 10 in the case where power supply is cut off.

Modification Example 1

In the inventive example, in the case where power supply to the optical disc device is cut off, the optical pickup device 4 is retracted to the position corresponding to the innermost circumferential portion of the flexible disc 10 using an emergency electric power stored in the backup power source 16. In the modification example 1, an optical pickup device 4 is retracted to the position corresponding to the innermost circumferential portion of the flexible disc 10 using a spring 121, in place of using the backup power source 16.

FIG. 9A is a diagram showing a recording and/or reproducing operation to be performed by the optical pickup device 4. FIG. 9B is a diagram showing a state that the optical pickup device 4 is retracted when power supply is cut off.

First, an arrangement of the modification example 1 is described.

Referring to FIGS. 9A and 9B, a stopper 111 has a bracket portion 111a on a wall surface thereof on the side of the optical pickup device 4, and the optical pickup device 4 has a bracket portion 4c on a wall surface thereof on the side of the stopper 111.

The spring 121 has a length as shown in FIG. 9B in an ordinary state without expansion/contraction. Both ends of the spring 121 are engaged with the bracket portions 111a and 4c, respectively. In this arrangement, a force to be applied from the spring 121 to the optical pickup device 4 in the state shown in FIG. 9B is zero. Further, the optical pickup device 4 is pulled in an inner circumferential direction of the flexible disc 10 by the spring 121, as the optical pickup device 4 is moved toward an outer circumference of the flexible disc 10, as shown in FIG. 9A.

Next, an operation of the modification example 1 is described.

Referring to FIG. 9A, the optical pickup device 4 is pulled in the inner circumferential direction of the flexible disc 10 by the spring 121 in response to driving of a sled motor 12, and similarly to the inventive example, the optical pickup device 4 is driven in radial direction of the flexible disc 10.

Referring to FIG. 9B, in the case where power supply to the optical disc device is cut off, a drive signal to a spindle motor 9 and the sled motor 12 is cut off. As a result, the flexible disc 10 is deprived of a driving force of the spindle motor 9, and is attempted to continue its rotation by an inertia force corresponding to the rotation number of a turntable 101a at a time immediately before the power supply is cut off. Likewise, the optical pickup device 4 is deprived of a driving force by the sled motor 12, and is moved in the inner circumferential direction of the flexible disc 10 by the spring 121. Similarly to the above, in the case where the rotation number of the flexible disc 10 is smaller than the minimum rotation number, driving of the sled motor 12 is suspended, and the optical pickup device 4 is moved in the inner circumferential direction of the flexible disc 10 by the spring 121.

After the power supply is cut off, the rotation number of the flexible disc 10 is gradually reduced as the time elapses, and the final shape of the flexible disc 10 coincides with the shape D1. However, a time required for moving the optical pickup device 4 to the position corresponding to the innermost circumferential portion of the flexible disc 10 by the spring 121 is significantly shorter than a time required for making the shape of the flexible disc 10 coincide with the shape D1. Accordingly, even if driving of the spindle motor 9 is suspended, the optical pickup device 4 can be retracted to the position corresponding to the innermost circumferential portion of the flexible disc 10, without contacting with the flexible disc 10.

As described above, similarly to the inventive example, in the modification example 1, even if power supply to the optical disc device is cut off, and the rotation number of the flexible disc 10 is reduced, there is no likelihood that the flexible disc 10 may be contacted with the optical pickup device 4. The modification example 1 enables to smoothly retract the optical pickup device 4 to a retracted position, without using an auxiliary power source, in the case where power supply is cut off.

Modification Example 2

In the modification example 1, the optical pickup device 4 is retracted to the position corresponding to the innermost circumferential portion of the flexible disc 10 by pulling the optical pickup device 4 at a position corresponding to the inner circumference of the flexible disc 10 by the spring 121. In the modification example 2, an optical pickup device 4 is retracted to the position corresponding to the innermost circumferential portion of the flexible disc 10 by pushing the optical pickup device 4 at a position corresponding to the outer circumference of the flexible disc 10.

Referring to FIGS. 9C and 9D, a stopper 112 has a bracket portion 112a on a wall surface thereof on the side of the optical pickup device 4, and the optical pickup device 4 has a bracket portion 4d on a wall surface thereof on the side of the stopper 112.

A spring 122 has a length as shown in FIG. 9D in an ordinary state without expansion/contraction. Both ends of the spring 122 are engaged with the bracket portions 112a and 4d, respectively. In this arrangement, a force to be applied from the spring 122 to the optical pickup device 4 in the state shown in FIG. 9D is zero. Further, the optical pickup device 4 is pushed in an inner circumferential direction of the flexible disc 10 by the spring 122, as the optical pickup device 4 is moved toward an outer circumference of the flexible disc 10, as shown in FIG. 9C.

Similarly to the modification example 1, in the modification example 2, in the case where power supply to the optical disc device is cut off, or the rotation number of the flexible disc 10 falls below the minimum rotation number, the optical pickup device 4 is retracted to the position corresponding to the innermost circumferential portion of the flexible disc 10 by the spring 122, and contact of the flexible disc 10 with the optical pickup device 4 is avoided.

Modification Example 3

In the inventive example, the optical pickup device 4 is retracted to the position corresponding to the innermost circumferential portion of the flexible disc 10 by the electric power stored in the backup power source 16. In the modification example 3, an optical pickup device 4 is retracted by vertically and downwardly moving a chassis 200 which supports a shaft 110, without using the backup power source 16.

Figures 11A, 11B:
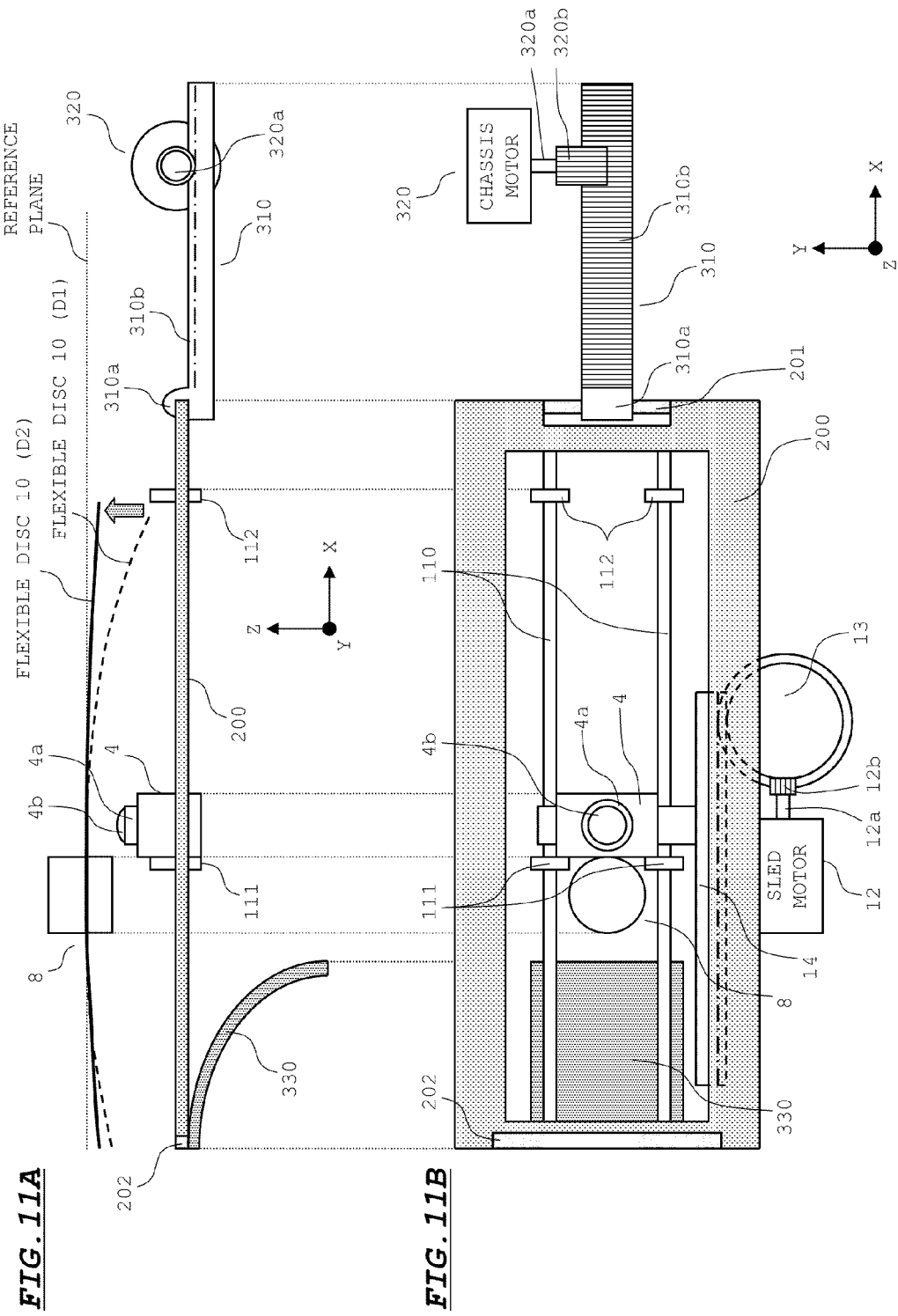
FIGS. 11A and 11B are diagrams showing an arrangement and an operation of the modification example 3.

FIGS. 10A, 10B, 11A, and 11B are diagrams showing an arrangement and an operation of the modification example 3. FIGS. 12A and 12B are diagrams showing an operation of the modification example 3. FIGS. 10A, 11A, 12A, and 12B are diagrams showing the arrangement of the modification example 3, viewed in the minus Y-axis direction, and FIGS. 10B and 11B are diagrams showing the arrangement of the modification example 3 in the plus Z-axis direction (from above the flexible disc 10).

First, the arrangement of the modification example 3 is described.

Referring to FIGS. 10A and 10B, the chassis 200 supports both ends of the shaft 110. A sled motor 12, a wheel gear 13, and a rack gear 14 are provided on the chassis 200 to be integrally moved with the chassis 200. This arrangement enables to move the optical pickup device 4 along the shaft 110 by the sled motor 12, even in the case where the chassis 200 is not aligned in parallel to a reference plane, as shown in FIGS. 10A and 10B.

The chassis 200 includes a support shaft 201 and a sliding portion 202 each having a certain length in Y-axis direction at an end thereof in the plus X-axis direction and an end thereof in the minus X-axis direction, respectively. The support shaft 201 has both ends thereof supported on the chassis 200, and is rotated about Y-axis. The sliding portion 202 is designed to have a small frictional resistance.

A rack gear 310 has a support portion 310a at an end thereof on the side of the chassis 200, and a gear surface 310b on a surface thereof on the side of the flexible disc 10. The rack gear 310 is supported in the interior of the optical disc device to be driven in X-axis direction. The support portion 310a has a support hole (not shown) in Y-axis direction, through which the support shaft 201 extends. The gear surface 310b is throated in Y-axis direction.

A chassis motor 320 has a motor gear support shaft 320a and a motor gear 320b. The chassis motor 320 rotates the motor gear 320b through the motor gear support shaft 320a. The chassis motor 320 is fixed to the interior of the optical disc device. The motor gear 320b is engaged with the gear surface 310b of the rack gear 310. In this arrangement, the rack gear 310 is driven in X-axis direction by rotating the motor gear 320b.

Referring to FIG. 10A, a sliding plate 330 is bulged toward the flexible disc 10 viewed in Y-axis direction, and referring to FIG. 10B, the sliding plate 330 has a rectangular shape viewed in Z-axis direction. The sliding plate 330 is designed to have a small frictional resistance on a surface thereof on the side of the flexible disc 10. Further, the sliding plate 330 is fixed to the interior of the optical disc device.

Next, a procedure of performing a recording and/or reproducing operation with respect to a recording surface of the flexible disc 10 is described in the modification example 3.

FIGS. 10A and 10B are diagrams showing an initial state of the optical disc device. Specifically, the sliding portion 202 is located at a lowermost position of the sliding plate 330 by moving the rack gear 310 to a farthest position from the flexible disc 10. Similarly to the inventive example, the flexible disc 10 is rotated by the spindle motor 9 in this state. When the rotation number of the spindle motor 9 reaches a predetermined value, as shown in FIG. 11A, the shape of the flexible disc 10 is stabilized as the shape D2.

Referring to FIGS. 11A and 11B, when the chassis motor 320 is driven, and the rack gear 310 is driven in the minus X-axis direction, as shown in FIGS. 11A and 11B, the chassis 200 is aligned in parallel to the reference plane. Specifically, when the chassis motor 320 is driven and the motor gear 320b is rotated clockwise in the state shown in FIGS. 10A and 10B, the rack gear 310 is driven in the minus X-axis direction. Then, the support shaft 201 of the chassis 200 is pushed in the minus X-axis direction by the support portion 310a, and the entirety of the chassis 200 is applied with a force in the minus X-axis direction. Accordingly, the sliding portion 202 slides upwardly along the sliding plate 330. Thereafter, when the chassis 200 is positioned at a final position in the minus X-axis direction, as shown in FIG. 11A, the chassis 200 is aligned in parallel to the reference plane. Accordingly, the optical pickup device 4, the shaft 110, the stopper 111, and the stopper 112 are brought to substantially the same state as the state shown in FIG. 6B in the inventive example. Thereafter, similarly to the inventive example, as shown in FIG. 12A, a recording and/or reproducing operation with respect to the flexible disc 10 is performed.

Next, an operation to be performed in the case where power supply to the optical disc device is cut off is described.

In the case where power supply to the optical disc device is cut off in the state shown in FIG. 12A, the driving force for driving the chassis motor 320 is gone. Accordingly, as shown in FIG. 12B, the support portion 310a of the rack gear 310 is pushed in the plus X-axis direction by the weight of the entirety of the chassis 200, and the sliding portion 202 slides downwardly along the sliding plate 330, thereby tilting the entirety of the chassis 200.

As the chassis 200 is tilted, the optical pickup device 4 is moved to the position corresponding to the innermost circumferential portion of the flexible disc 10. Specifically, assuming that the position of the optical pickup device 4 at a point of time when power supply is cut off is indicated by the broken line in FIG. 12B, the optical pickup device 4 slips obliquely downwardly in the minus X-axis direction along the shaft 110 by the weight of the optical pickup device 4, as the chassis 200 is tilted as described above. Then, the movement of the optical pickup device 4 is stopped by the stopper 111, and the optical pickup device 4 is moved to the position corresponding to the innermost circumferential portion of the flexible disc 10.

Similarly to the above, in the case where the rotation number of the flexible disc 10 is smaller than the minimum rotation number, power supply to the chassis motor 320 is suspended. As a result, the entirety of the chassis 200 is tilted, and the optical pickup device 4 is moved to the position corresponding to the innermost circumferential portion of the flexible disc 10. The sliding plate 330 is bulged toward the disc surface. Accordingly, in the case where power supply is cut off, the optical pickup device 4 is slowly moved downwardly. This enables to reduce an impact resulting from lowering the optical pickup device 4. Alternatively, impact reducing means may be provided, in place of bulging the sliding plate 330 toward the disc surface.

Similarly to the inventive example, in the modification example 3, even if power supply to the optical disc device is cut off, and the rotation number of the flexible disc 10 is reduced, there is no likelihood that the flexible disc 10 may be contacted with the optical pickup device 4. The modification example 3 is further advantageous in smoothly avoiding contact of the optical pickup device 4 with the flexible disc 10, because the optical pickup device 4 is moved away from the flexible disc 10 at the time when power supply is suspended.

Modification Example 4

In the modification example 3, the optical pickup device 4 is retracted by vertically moving the chassis 200 by the rack gear 310, the sliding portion 302, and the sliding plate 330. In the modification example 4, an optical pickup device 4 is retracted by tilting a chassis 200 by a jack mechanism, in place of using the sliding portion 302 and the sliding plate 330.

FIGS. 13A, 13B, 14A, and 14B are diagrams showing an arrangement and an operation of the modification example 4. FIGS. 13A and 13B are diagrams respectively showing arrangements, wherein the chassis 200 is tilted, viewed in the minus Y-axis direction and the plus Z-axis direction (from above the flexible disc 10), and FIGS. 14A and 14B are diagrams respectively showing arrangements, wherein the chassis 200 is not tilted, viewed in minus Y-axis direction and the plus Z-axis direction (from above the flexible disc 10).

First, the arrangement of the modification example 4 is described.

Referring to FIGS. 13A and 13B, the chassis 200 has a support hole (not shown) extending in Y-axis direction at an end thereof in the plus X-axis direction. A support shaft 203 is passed through the support hole. Both ends of the support shaft 203 are supported in the interior of the optical disc device in such a manner that the support shaft 203 is rotatable about Y-axis.

Referring to FIGS. 14A and 14B, the chassis 200 has a pair of support shafts 204 each having a certain length in Y-axis direction at an end thereof in the minus X-axis direction. Each of the support shafts 204 has both ends thereof supported on the chassis 200, and is rotated about Y-axis. The chassis 200 also has support holes 200a in a side surface (a surface in parallel to X-Z plane) near an end of the chassis 200 in the minus X-axis direction. Each of the support holes 200a has a certain width along a side surface of the chassis 200.

A pair of jack members 340 each has support holes (not shown) at both ends thereof in Y-axis direction. The corresponding ends of each of the jack members 340 respectively support a support shaft 341 and the support shaft 204. Both ends of the support shaft 341 are fixed to the interior of the optical disc device so that the support shaft 341 is rotatable about Y-axis. Each of the support shafts 204 is passed through the support hole 200a in Y-axis direction.

A pair of jack members 350 each has support holes (not shown) at both ends thereof in Y-axis direction. The corresponding ends of each of the jack members 350 respectively support the corresponding support shaft 204 and a support shaft 351. One end of the support shaft 351 is passed through a support portion 310a of a rack gear 310. The rack gear 310 is a rack gear substantially equivalent to the rack gear shown in the modification example 3, and is supported in the interior of the optical disc device to be driven in X-axis direction. A chassis motor which drives the rack gear 310 in X-axis direction is not illustrated to simplify the description.

Next, a procedure of performing a recording and/or reproducing operation with respect to a recording surface of the flexible disc 10 is described in the modification example 4.

Similarly to the modification example 3, in the modification example 4, the chassis 200 is aligned in parallel to a reference plane by moving the rack gear 310 in the minus X-axis direction. Specifically, the support shaft 351 is moved in the minus X-axis direction by driving the rack gear 310 in the minus X-axis direction in the state shown in FIGS. 13A and 13B. Accordingly, the ends of the paired jacked members 350 on the side of the support shaft 351 are projected in the minus X-axis direction. Accordingly, the chassis 200 is pivotally rotated clockwise about an axis of the support shaft 203. In this arrangement, the chassis 200 is stably and pivotally rotated by moving the support shafts 204 in the support holes 200a. As a result, as the overall arrangement, the chassis 200 is aligned in parallel to the reference plane, as shown in FIGS. 14A and 14B. Thereafter, similarly to the inventive example, a recording and/or reproducing operation with respect to the flexible disc 10 is performed.

Next, an operation to be performed in the case where power supply to the optical disc device is cut off is described.

Similarly to the modification example 3, in the modification example 4, when power supply to a chassis motor (not shown) is cut off, a driving force for driving the rack gear 310 is gone. Accordingly, the support portion 310a of the rack gear 310 is pushed in the plus X-axis direction through the support shaft 351 by the weight of the entirety of the chassis 200, thereby returning the entirety of the chassis 200 to an initial state.

Similarly to the above, in the case where the rotation number of the flexible disc 10 is smaller than the minimum rotation number, transmission of a driving force for driving the rack gear 310 is blocked. As a result, the chassis 200 is tilted, and the optical pickup device 4 is moved to the position corresponding to the innermost circumferential portion of the flexible disc 10.

Similarly to the modification example 3, in the modification example 4, there is no likelihood that the flexible disc 10 may be contacted with the optical pickup device 4. Similarly to the modification example 3, the modification example 4 is further advantageous in smoothly avoiding contact of the optical pickup device 4 with the flexible disc 10, because the optical pickup device 4 is moved away from the flexible disc 10 at the time when power supply is suspended.

As described above, the inventive example, and the modification examples 1 through 4 are described as the embodiment of the invention. The invention is not limited to the foregoing. Further, the inventive example may be modified in various ways other than the above.

For instance, in the inventive example, and the modification examples 1 and 2, the optical pickup device 4 is retracted to the position corresponding to the innermost circumferential portion of the flexible disc 10. Alternatively, the optical pickup device 4 may be retracted to an outer position from the position corresponding to the outermost circumferential portion of the flexible disc 10. In the modification examples 3 and 4, the chassis 200 is tilted toward the inner circumference of the flexible disc 10. Alternatively, the chassis 200 may be tilted toward the outer circumference of the flexible disc 10.

In the modification examples 1 through 4, rotation of the flexible disc 10 may be retained by using the backup power source 16. In the modification, the rotation of the flexible disc 10 may be suspended after detecting that the optical pickup device 4 is retracted to the retracted position; or the rotation of the flexible disc 10 may be suspended upon lapse of a predetermined period of time after power supply to the optical disc device is cut off. The modification is advantageous in securely retracting the optical pickup device 4 because rotation of the spindle motor 9 is maintained for a predetermined period of time by the backup power source 16, after power supply to the optical disc device is cut off.

In the modification examples 3 and 4, the chassis 200 is tilted, and the optical pickup device 4 slides obliquely downwardly along the shaft 110 by the weight thereof in order to retract the optical pickup device 4. Alternatively, the movement of the optical pickup device 4 may be aided by using the backup power source 16. Specifically, when the chassis 200 is tilted, the sled motor 12 is driven by the backup power source 16 to move the optical pickup device 4 toward the position corresponding to the innermost circumferential portion of the flexible disc 10. Accordingly, the optical pickup device 4 is securely retracted to the position corresponding to the innermost circumferential portion of the flexible disc 10. Further alternatively, in performing the above operation, the chassis motor 320 may be driven to tilt the chassis 200. The modification is advantageous in securely retracting the optical pickup device 4.

In the modification examples 3 and 4, only one end of the chassis 200 is moved in vertical direction. Alternatively, both ends of the chassis 200 may be moved in vertical direction. For instance, a motor and an elevating mechanism are provided at each of both ends of the chassis 200 so that the entirety of the chassis 200 is driven in vertical direction with respect to the flexible disc 10 by driving the motors. This arrangement enables to retract the optical pickup device 4 in vertical direction by suspending power supply to the motors.

In the inventive example and the modification examples, an optical system incorporated with a solid immersion lens may be used, in place of the optical system incorporated with the objective lens 4b. In particular, use of the solid immersion lens is advantageously applied to the invention, because the distance between a disc and the solid immersion lens is extremely short due to a large NA of the lens (NA≦1.0).

In the foregoing, an optical disc is used as a disc having flexibility. Alternatively, a disc other than the optical disc e.g. a magneto-optical disc having flexibility, or a hard disc (a magnetic disc) having flexibility may be used. In the modification, a head compatible with a disc other than the optical disc is used, in place of the optical pickup device.

In the modification examples 1 and 2, the springs 121 and 122 are coupled to the optical pickup device 4. Alternatively, a mechanism for biasing the optical pickup device 4 to a retracted position by contact with the optical pickup device 4 in response to cut off of power supply may be provided, in place of the spring.

For instance, referring to FIG. 15A, a pressing bar 400 for pushing an optical pickup device 4 is provided in a state that the pressing bar 400 is resiliently biased in an inner circumferential direction of a disc by a resilient urging member (such as a spring). A locking mechanism 410 is provided to lock the pressing bar at a locking position (a position where movement of the optical pickup device 4 is not obstructed) against a resilient force. The locking mechanism 410 is constructed in such a manner that the pressing bar 400 is kept in a locked state by e.g. a plunger 411 in a power supply state; and the engagement with the pressing bar 400 is released by a spring force when power supply is cut off, and the plunger 411 is set to an inoperative state. A cushion member is attached to a distal end of the pressing bar 400.

Referring to FIG. 15B, in the above arrangement, when power supply is cut off at the time of a recording and/or reproducing operation, the plunger 411 is set to an inoperative state, and a locked state by the locking mechanism 410 is released. As a result, the pressing bar 400 is moved in the inner circumferential direction of the disc by a resilient urging force to pressingly move the optical pickup device 4 to the position corresponding to the innermost circumferential position of the disc. Accordingly, the optical pickup device 4 is moved to the retracted position, and contact of the optical pickup device 4 with the flexible disc 10 is avoided. In this arrangement, since the optical pickup device 4 is not coupled to a spring or the like, the optical pickup device 4 can be smoothly moved at the time of a recording and/or reproducing operation. Further, similarly to the above, this arrangement enables to smoothly retract the optical pickup device 4 to the retracted position, without using an auxiliary power source when power supply is cut off.

The pressing bar 400, which is moved in the inner circumferential direction of the flexible disc 10 after the locked state is released, is moved to the locking position by e.g. driving the sled motor 12 to move the optical pickup device 4 in the outer circumferential direction of the flexible disc 10. In this arrangement, the pressing bar 400 is moved to the locking position while being pushed by the optical pickup device 4. Thereafter, as shown in FIG. 15A, activating the plunger 411 or the like enables to lock the pressing bar at the locking position by the locking mechanism. Thus, the moving stroke of the optical pickup device 4 is secured.

Alternatively, a conductive polymer actuator (ion-conductive actuator) which is displaced by application of a voltage may be used, in place of the mechanism shown in FIGS. 15A and 15B. In the modification, the conductive polymer actuator is so configured and positioned as to pressingly move the optical pickup device 4 to a retracted position in a voltage non-application state, and not to obstruct the moving stroke of the optical pickup device 4 in a voltage application state. A conductive polymer actuator may be used as a drive source for the pressing bar 400 shown in FIGS. 15A and 15B.

In the foregoing arrangement, the reference plane is aligned with a horizontal plane. The invention is applicable to a disc device, wherein a flexible disc is loaded in a condition that the flexible disc is flexed and contacted with the optical pickup device 4 by the gravitational force at the time when rotation of the disc is suspended. For instance, the invention is applicable to a disc device, wherein the reference plane is titled in an angular range, in which the reference plane is aligned substantially vertically with respect to a horizontal plane. In the disc device, the disc is also flexed by the weight thereof when power supply is cut off, and rotation of the disc is lowered. Accordingly, damage of the disc and the optical pickup device 4 can be avoided by retracting the optical pickup device 4.

Further, the invention is applicable to a disc device loadable with a flexible disc whose angular velocity is constant, in addition to a flexible disc whose linear velocity is constant.

The embodiment of the invention may be changed or modified in various ways as necessary, as far as such changes and modifications do not depart from the scope of the claims of the invention hereinafter defined.

What is claimed is:

1. A disc device for recording and/or reproducing information with respect to a disc having flexibility, the disc device comprising:
   a head for writing and/or reading, the head being disposed below the disc;
   a disc rotating section for rotating the disc, the disc being flexed downwardly by gravitational force when the disc is not rotated, and being lift up by centrifugal force when the disc is rotated by the disc rotating section; and
   a head retracting section for retracting the head to a retracted position where contact with the disc is avoidable, based on a judgment that power supply to the disc device is cut off.

2. The disc device according to claim 1, further comprising: a guide mechanism for guiding the head in a radial direction of the disc;
   a head driving section for driving the head using an electric power by the guide mechanism at a time of a recording and/or reproducing operation; and
   an auxiliary power source for supplying an electric power when the power supply to the disc device is cut off, wherein the retracted position is set on a moving stroke of the head by the guide mechanism, and the head retracting section drives the head driving section to retract the head to the retracted position by the electric power to be supplied from the auxiliary power source, in the case where the power supply to the disc device is cut off.

3. The disc device according to claim 1, further comprising:
   a guide mechanism for guiding the head in a radial direction of the disc; and
   a head driving section for driving the head using an electric power by the guide mechanism at a time of a recording and/or reproducing operation, wherein the retracted position is set on a moving stroke of the head by the guide mechanism, and the head retracting section includes an urging mechanism urging the head to the retracted position in accordance with suspending of the power supply.

4. The disc device according to claim 1, wherein the head retracting section includes:
   a head support section for supporting the head to be movable in a radial direction of the disc;
   a support mechanism for supporting the head support section to be movable between a first position where the head support section is close to the disc, and a second position where the head support section is away from the disc; and
   a lift driving section for lifting the head support section using an electric power to position the head support section at the first position.

5. The disc device according to claim 1, further comprising:
   an auxiliary power source for supplying an electric power when the power supply to the disc device is cut off, wherein the disc rotating section is operable to continue rotation of the disc, using the electric power to be supplied from the auxiliary power source, in the case where the power supply to the disc device is cut off.

6. A disc device for recording and/or reproducing information with respect to a disc having flexibility, the disc device comprising:
   a head for writing and/or reading, the head being disposed below the disc;
   a disc rotating section for rotating the disc; and
   a head retracting section for retracting the head to a retracted position where contact with the disc is avoidable, based on a judgment that a rotational speed of the disc falls below a predetermined threshold value.

7. A disc device for recording and/or reproducing information with respect to a disc having flexibility, the disc device comprising:
   a head for writing and/or reading, the head being disposed below the disc;
   a disc rotating section for rotating the disc, the disc being flexed downwardly by gravitational force when the disc is not rotated, and being lift up by centrifugal force when the disc is rotated by the disc rotating section; and
   a head retracting section for retracting the head to a retracted position where contact with the disc is avoidable in a condition that the disc is likely to be contacted with the head resulting from lowering of a rotational speed of the disc.

\* \* \* \* \*